United States Patent
Haynes et al.

(10) Patent No.: US 12,059,998 B2
(45) Date of Patent: Aug. 13, 2024

(54) TURN SIGNAL AUTO CANCEL MECHANISM HAVING AXIALLY-OPERABLE TOGGLE

(71) Applicant: GHSP, Inc., Holland, MI (US)

(72) Inventors: Bill Haynes, Norton Shores, MI (US); Ryan Mass, Grand Haven, MI (US)

(73) Assignee: GHSP, Inc., Holland, MI (US)

( * ) Notice: Subject to any disclaimer, the term of this patent is extended or adjusted under 35 U.S.C. 154(b) by 180 days.

(21) Appl. No.: 17/770,802

(22) PCT Filed: Oct. 23, 2020

(86) PCT No.: PCT/IB2020/059981
§ 371 (c)(1),
(2) Date: Apr. 21, 2022

(87) PCT Pub. No.: WO2021/079334
PCT Pub. Date: Apr. 29, 2021

(65) Prior Publication Data
US 2022/0402426 A1     Dec. 22, 2022

Related U.S. Application Data

(60) Provisional application No. 62/925,785, filed on Oct. 25, 2019.

(51) Int. Cl.
*B60Q 1/42* (2006.01)
*B60Q 1/00* (2006.01)
*H01H 19/14* (2006.01)

(52) U.S. Cl.
CPC ............. *B60Q 1/425* (2013.01); *H01H 19/14* (2013.01); *B60Q 1/0076* (2013.01)

(58) Field of Classification Search
CPC ........ H01H 19/14; H01H 19/20; H01H 19/22; H01H 19/60; H01H 19/605; H01H 3/00;
(Continued)

(56) References Cited

U.S. PATENT DOCUMENTS 5,923,010 A    7/1999  Khoury et al.
6,472,623 B1  10/2002  Hayashi
(Continued)

FOREIGN PATENT DOCUMENTS

CN     101746310 A    6/2010
EP       0778176 A2    6/1997
(Continued)

*Primary Examiner* — Anthony R Jimenez
(74) *Attorney, Agent, or Firm* — Price Heneveld LLP

(57) ABSTRACT

A steering assembly for a vehicle includes a housing having a signal portion and defining a shaft enclosure. A steering shaft includes a cancellation rib that rotates about a rotational axis and within the shaft enclosure. A trunnion rotates within the signal portion of the housing about a trunnion axis to define a null position and right-turn and left-turn positions. A toggle includes a cancellation member. The toggle axially and rotationally operates with respect to one of the trunnion and the turn-signal housing. The cancellation member in the null position is within the shaft enclosure and axially offset from the cancellation rib. The cancellation member in one of the right-turn and left-turn positions is within the shaft enclosure and axially aligned for selective engagement with the cancellation rib. Selective engagement of the cancellation rib and the cancellation member axially operates the toggle to the null position.

20 Claims, 19 Drawing Sheets

(58) Field of Classification Search
CPC .. H01H 3/02; H01H 3/08; H01H 3/10; H01H 3/04; H01H 3/06; H01H 9/16; H01H 21/00; H01H 2009/066; H01H 2221/016; H01H 2231/026; H01H 2239/05; B60Q 1/00; B60Q 1/0076; B60Q 1/26; B60Q 1/2607; B60Q 1/2619; B60Q 1/34; B60Q 1/343; B60Q 1/36; B60Q 1/40; B60Q 1/42; B60Q 1/425
USPC ...................................................... 200/61.27
See application file for complete search history.

(56) References Cited

U.S. PATENT DOCUMENTS

| | | |
|---|---|---|
| 6,677,543 B2 | 1/2004 | Takahashi et al. |
| 7,038,580 B2 | 5/2006 | Takahashi |
| 7,622,687 B2 | 11/2009 | Sugino et al. |
| 8,431,847 B2 | 4/2013 | Kaburagi et al. |
| 8,552,319 B2 | 10/2013 | Nakamura et al. |
| 8,822,856 B2 | 9/2014 | Kosaka |
| 9,041,526 B2 | 5/2015 | Nishimura |
| 9,227,560 B2 | 1/2016 | Kikuchi et al. |
| 10,011,217 B2 | 7/2018 | Noguchi |
| 2002/0100668 A1* | 8/2002 | Ito ......................... B60Q 1/425 |
| | | 200/61.3 |

FOREIGN PATENT DOCUMENTS

| | | |
|---|---|---|
| EP | 2756991 A1 | 7/2014 |
| EP | 3192699 A1 | 7/2017 |
| JP | 2012195103 A | 10/2012 |

* cited by examiner

TURN SIGNAL AUTO CANCEL MECHANISM HAVING AXIALLY-OPERABLE TOGGLE

FIELD OF THE INVENTION

The present invention generally relates to vehicle turn signals, and more specifically, a vehicle turn signal having an auto cancel mechanism that includes an axially-operable cancel toggle that operates along an axis of rotation for the drive shaft.

BACKGROUND OF THE INVENTION

Vehicles typically include a turn signal cancel mechanism that cooperates with the steering column to automatically cancel when the steering column is rotated opposite the direction of the turn being signaled. This mechanism cooperates with various biasing mechanisms which maintain the turn signal in a right-turn or a left-turn position, to reset that turn position back to a null position upon rotation of the steering column in a direction opposite of that selected with the stalk.

SUMMARY OF THE INVENTION

According to one aspect of the present invention, a steering assembly for a vehicle includes a turn-signal housing having a signal portion and defining a shaft enclosure. A steering shaft includes a cancellation rib that rotates about a rotational axis and within the shaft enclosure. A trunnion rotates within the signal portion of the turn-signal housing about a trunnion axis to define a null position and right-turn and left-turn positions. A toggle includes a cancellation member. The toggle axially and rotationally operates with respect to one of the trunnion and the turn-signal housing. The cancellation member in the null position is within the shaft enclosure and axially offset from the cancellation rib. The cancellation member in one of the right-turn and left-turn positions is within the shaft enclosure and axially aligned for selective engagement with the cancellation rib. Selective engagement of the cancellation rib and the cancellation member axially operates the toggle to the null position.

According to another aspect of the present invention, a steering assembly for a vehicle includes a steering shaft that rotates about a rotational axis. The steering shaft includes a cancellation rib. A turn-signal housing includes an internal shaft perimeter that surrounds the steering shaft and the cancellation rib. A trunnion is rotationally coupled to the turn-signal housing and rotates about a trunnion axis. A toggle rotationally and axially operates relative to the trunnion and the turn-signal housing. The toggle includes a cancellation member that extends through the internal shaft perimeter to selectively engage the cancellation rib in a right-turn position and a left-turn position. The cancellation member extends through the internal shaft perimeter and is axially offset from the cancellation rib in a rest position where the cancellation rib bypasses the cancellation member.

According to another aspect of the present invention, a turn signal cancellation mechanism includes a housing having an internal shaft perimeter that surrounds a rotational axis. The internal shaft perimeter is configured to surround a steering shaft and a cancellation member that rotationally operate about the rotational axis. A trunnion is rotationally coupled to the turn-signal housing and rotates about a trunnion axis. A toggle includes a biasing protrusion that slidably engages an axial positioning surface of the housing and a guide protrusion that extends through a guide aperture of the trunnion. The biasing protrusion and guide protrusion rotationally and axially operate about an axis of rotation that remains parallel with the trunnion axis. The toggle includes a cancellation member that extends through the internal shaft perimeter and toward the rotational axis. The cancellation member is configured to selectively engage the cancellation rib in a turn position and is further configured to be axially offset from the cancellation rib in a rest position where the cancellation rib bypasses the cancellation member.

According to another aspect of the present invention, a steering assembly for a vehicle includes a steering shaft having a rotational axis. The steering shaft includes a cancellation rib. A turn-signal housing surrounds the steering shaft. The housing includes a right-turn interface and a left-turn interface. A trunnion is coupled with the turn-signal housing. The trunnion rotationally operates relative to the turn-signal housing about a trunnion axis between a null position and right-turn and left-turn positions. A stalk is rotationally coupled to the turn-signal housing via the trunnion. A toggle selectively and alternatively releases the stalk and the trunnion from one of the right-turn position and the left-turn position. The toggle has a cancellation member that extends beyond an internal perimeter of the turn-signal housing and toward the steering shaft. A spring that biases the toggle away from the trunnion and in a direction parallel with the rotational axis. Operation of the stalk in a first direction operates the toggle with the right-turn interface to bias the toggle away from the trunnion and along the rotational axis to selectively secure the toggle in the right-turn position and within the path of the cancellation rib. Operation of the steering wheel in a clockwise rotational direction engages the cancellation rib of the steering shaft with the cancellation member to slidably operate the toggle with the right-turn interface to bias the toggle along the rotational axis and away from the right-turn position. The trunnion returns to the null position between the right-turn and left-turn positions. Operation of the stalk in a second direction operates the toggle with the left-turn interface to bias the toggle away from the trunnion and along the rotational axis to selectively secure the toggle in the left-turn position and within the path of the cancellation rib. Operation of the steering wheel in a counter-clockwise rotational direction engages the cancellation rib of the steering shaft with the cancellation member to slidably operate the toggle with the left-turn interface to bias the toggle along the rotational axis and away from the left-turn position. The trunnion returns to the null position between the right-turn and left-turn positions.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
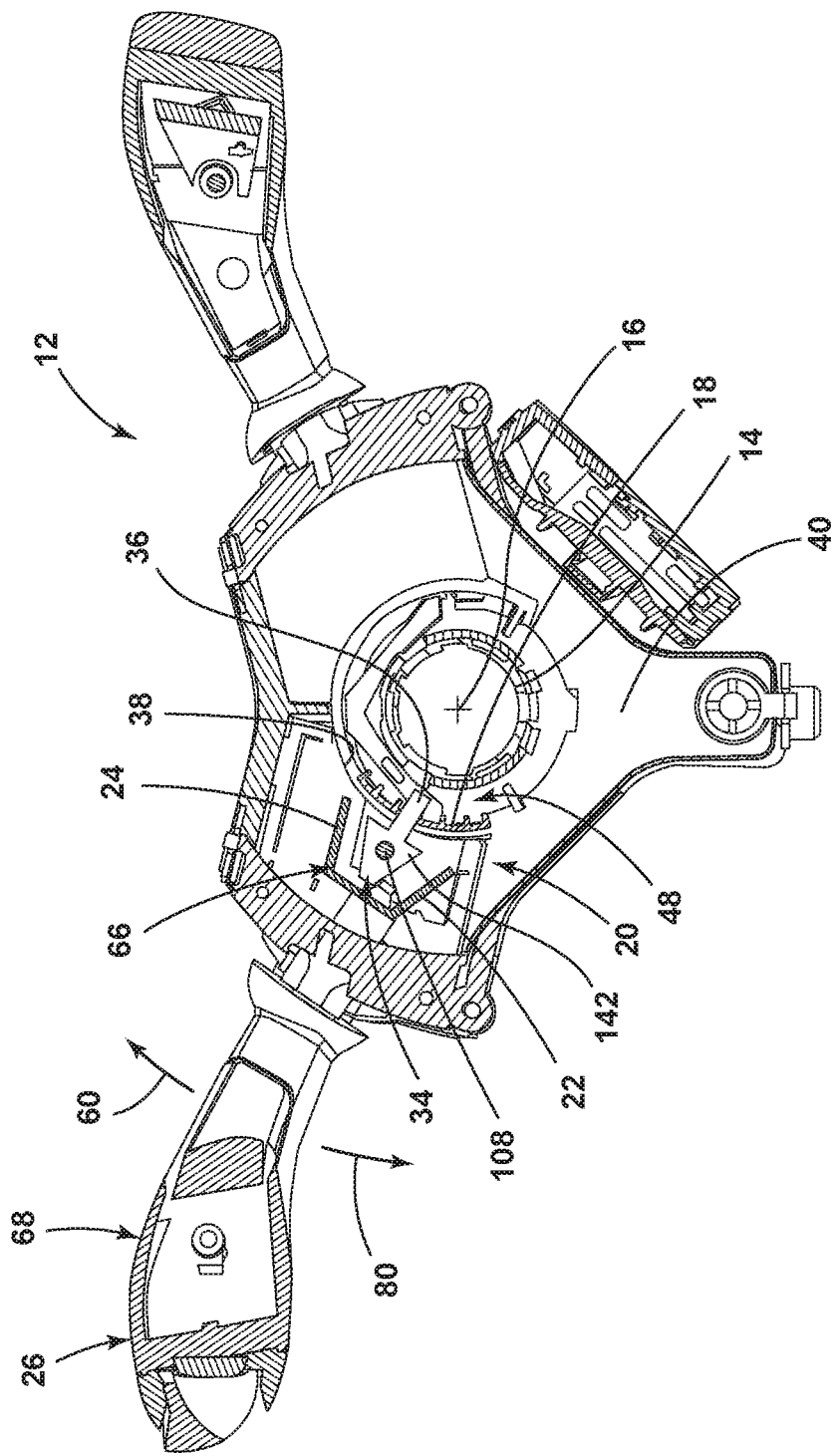
FIG. 1 is a cross-sectional view of a steering assembly incorporating an aspect of a turn signal assembly that incorporates an aspect of the toggle, and showing the toggle in the central rest position and the stalk in the null position.
Figure 2:
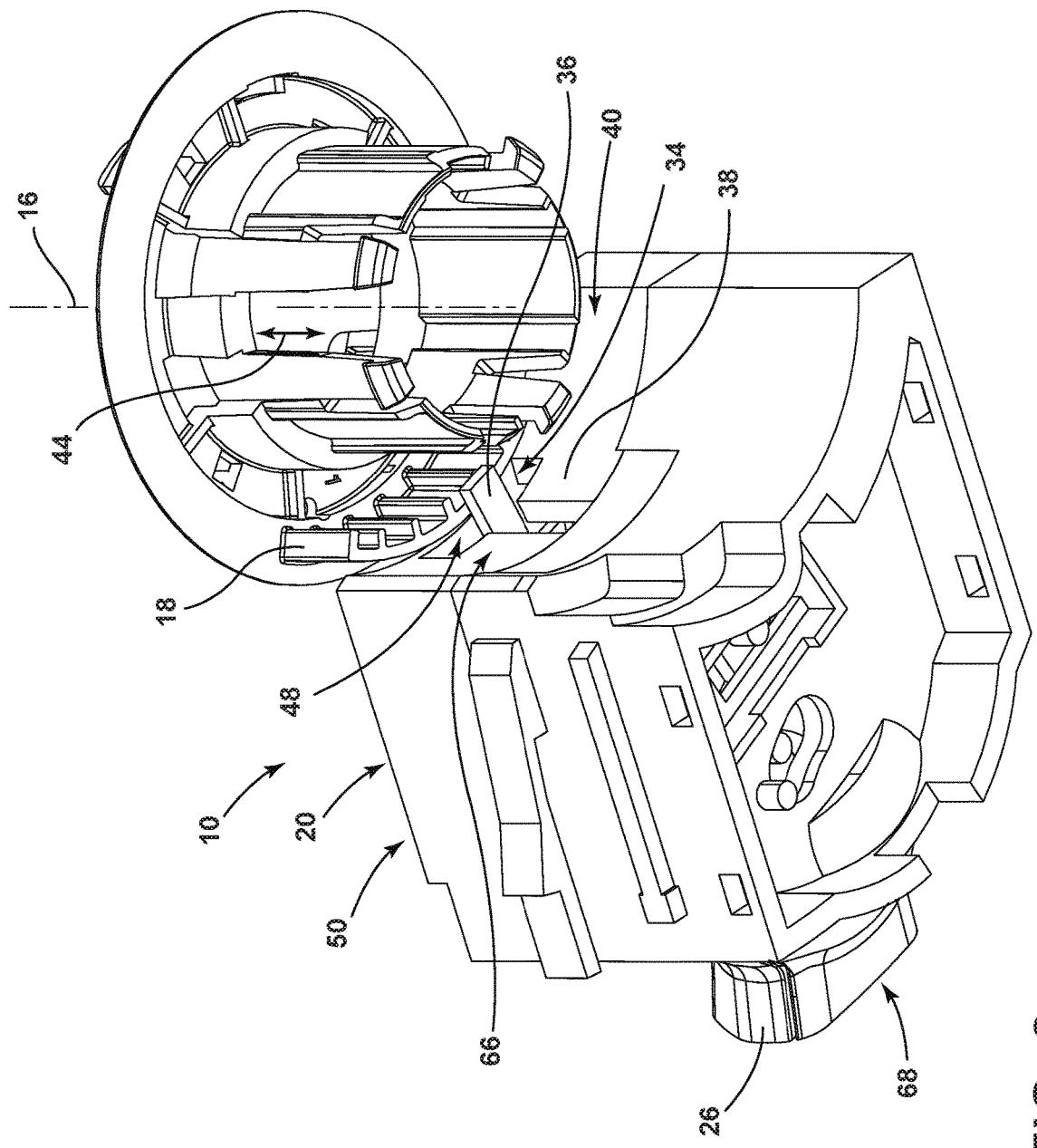
FIG. 2 is a bottom perspective view of the turn signal assembly of FIG. 1.
Figure 3:
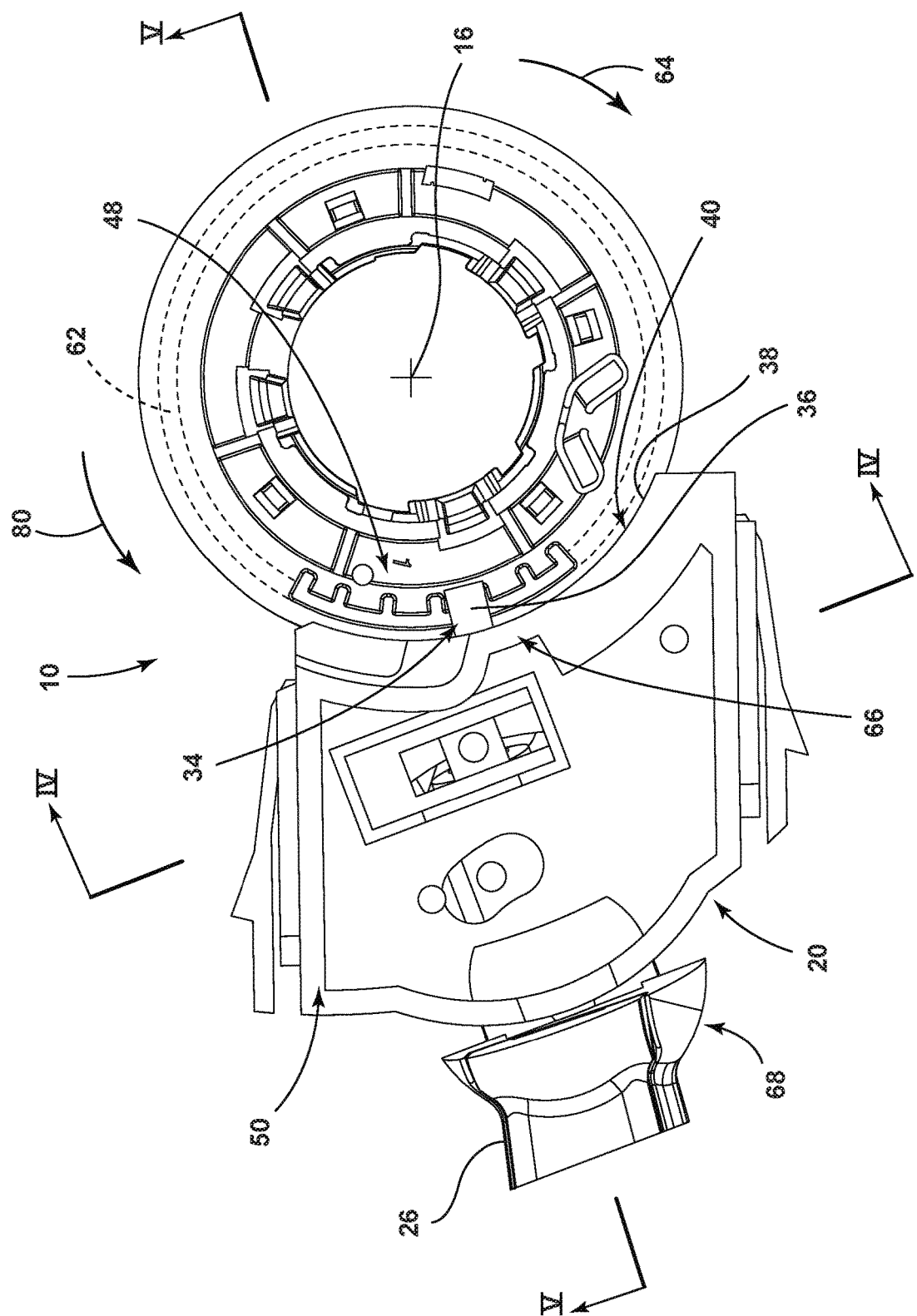
FIG. 3 is a bottom plan view of the turn signal assembly of FIG. 2.
Figure 4:
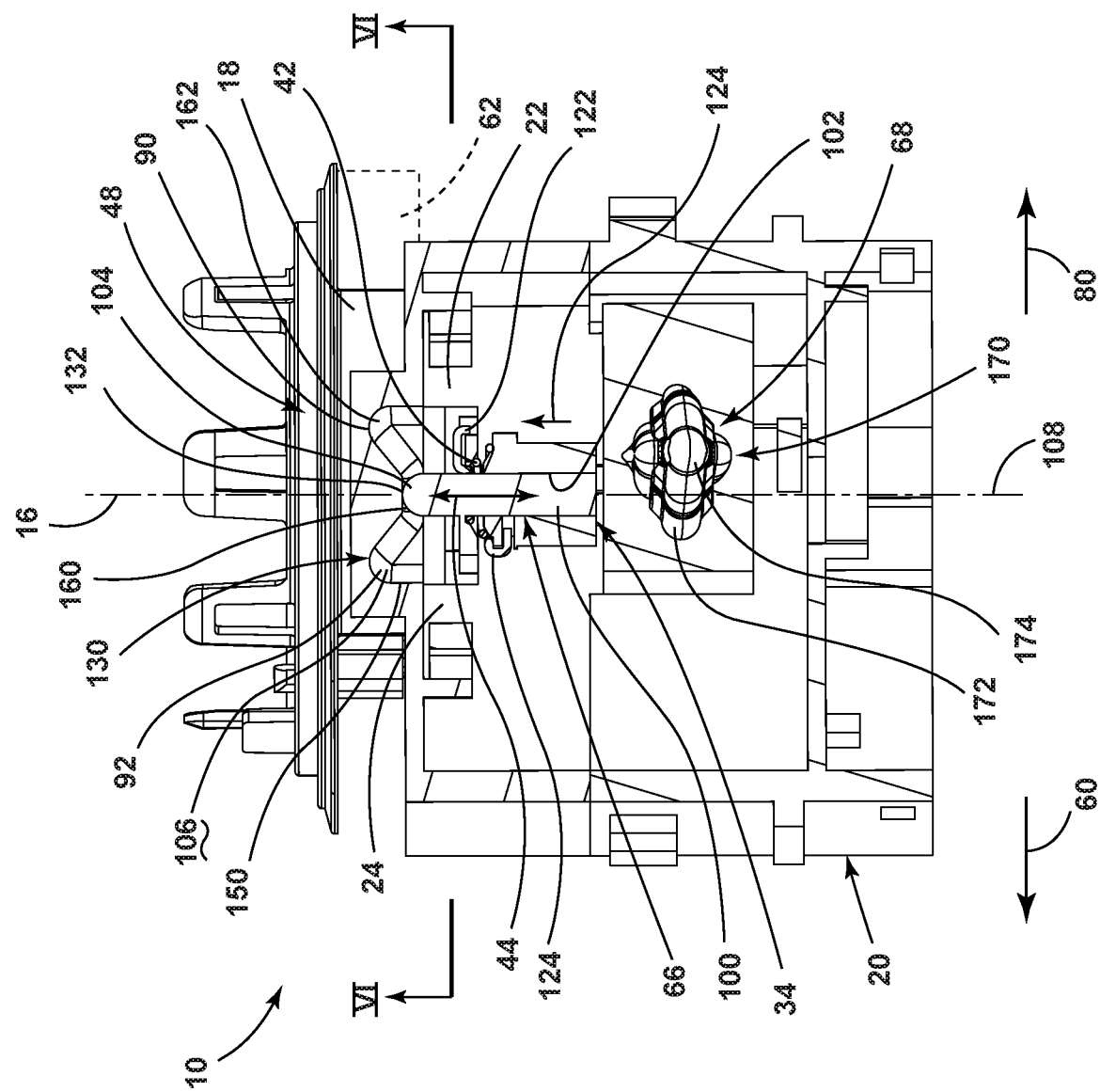
FIG. 4 is a cross-sectional view of the turn-signal assembly of FIG. 3, taken along line IV-IV.
Figure 5:
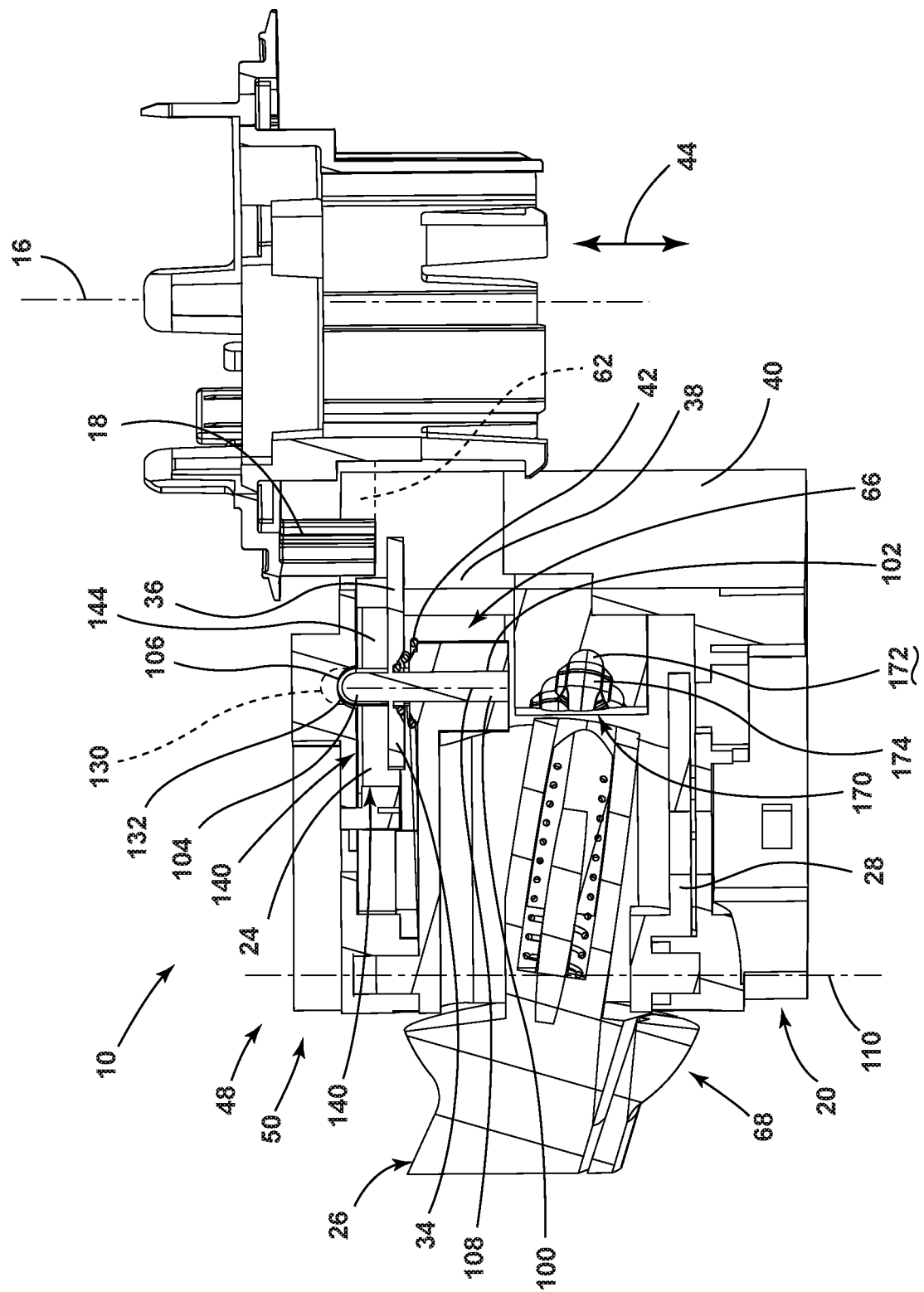
FIG. 5 is cross-sectional view of the turn-signal assembly of FIG. 3, taken along line V-V.
Figure 6:
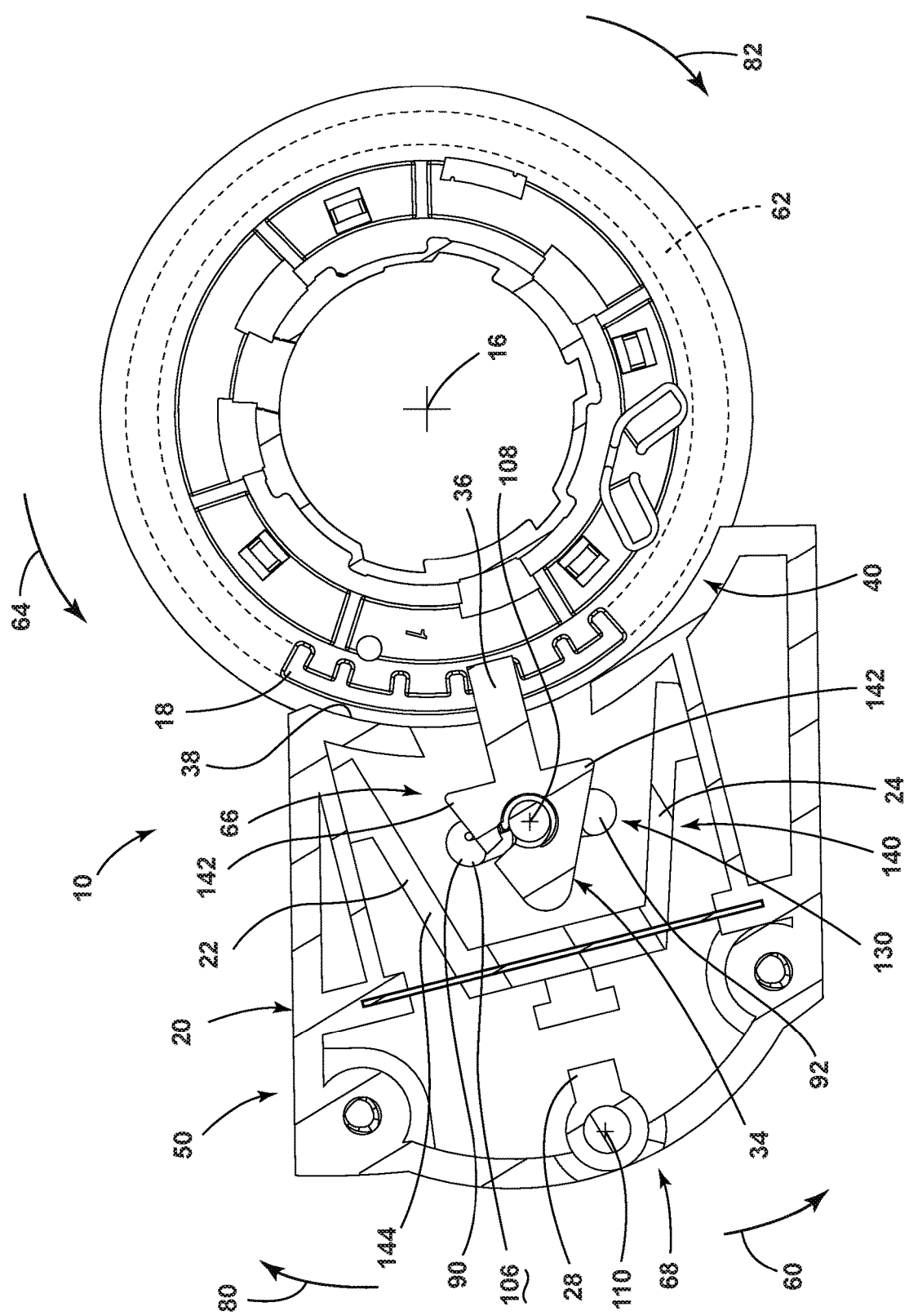
FIG. 6 is a cross-sectional view of the turn-signal assembly of FIG. 4, taken along line VI-VI.
Figure 7:
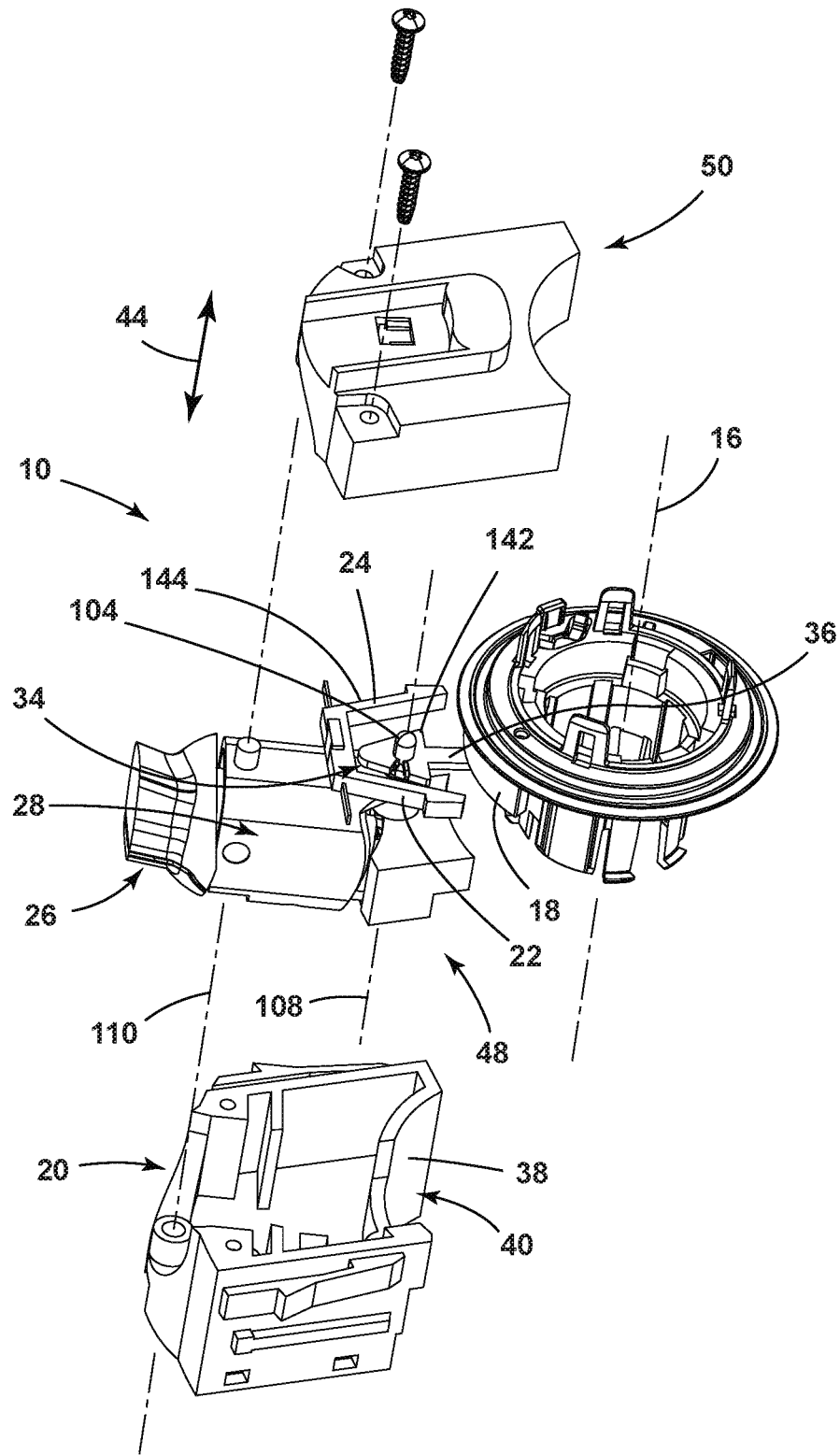
FIG. 7 is an exploded perspective view of the turn-signal assembly of FIG. 2.
Figure 8:
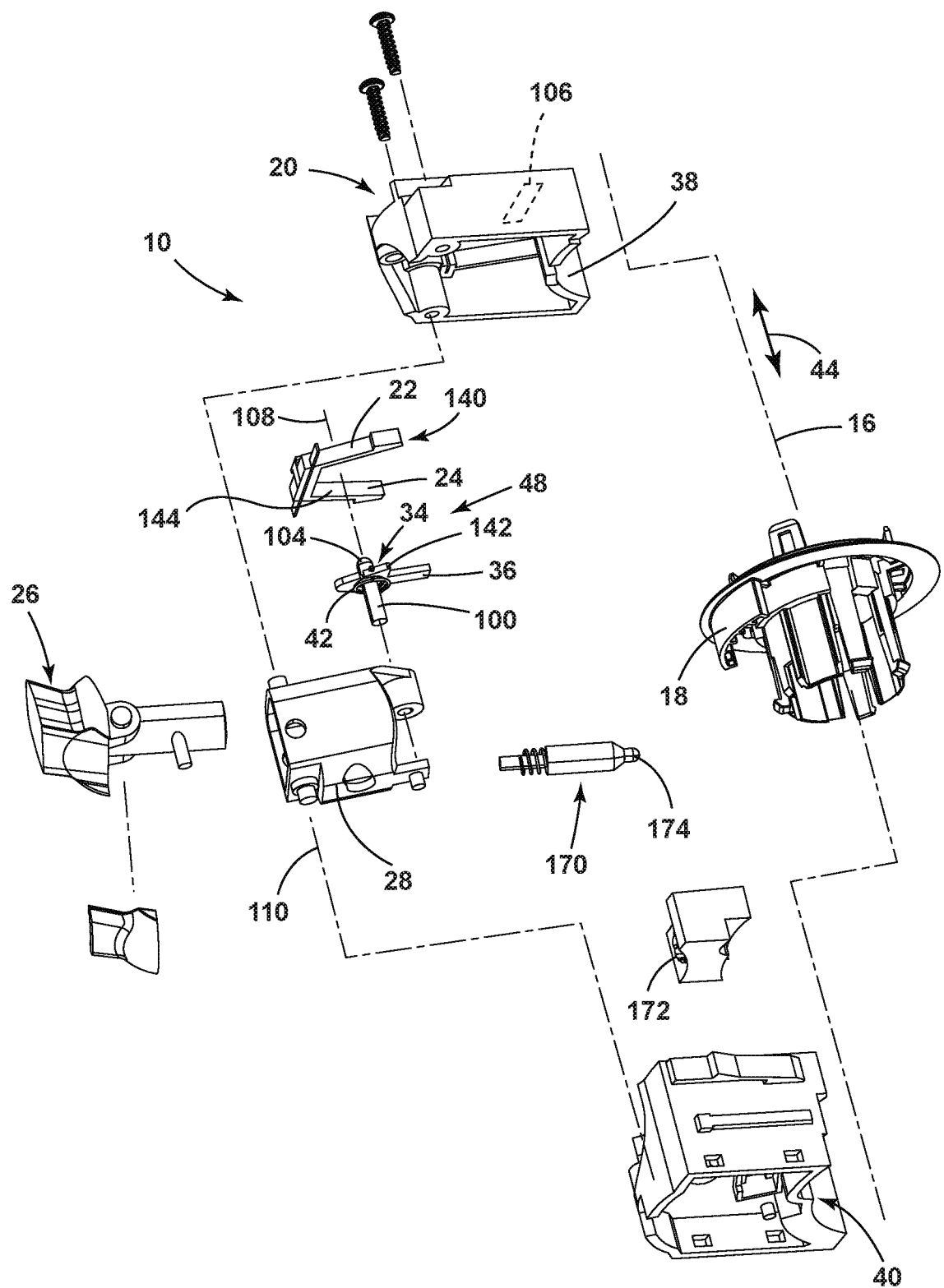
FIG. 8 is another exploded perspective view of the turn-signal assembly of FIG. 2.
Figure 9:
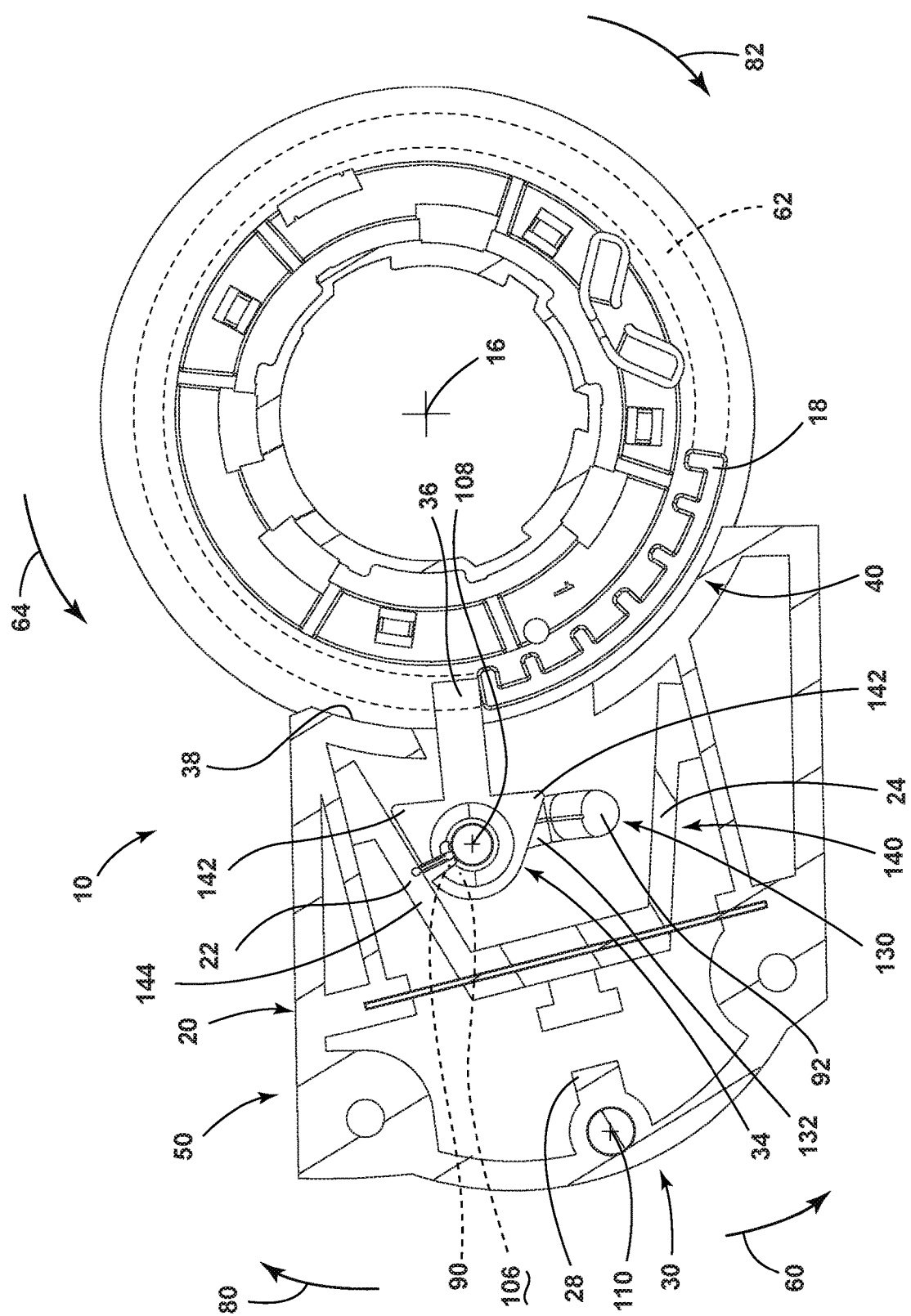
FIG. 9 is the turn signal assembly of FIG. 6 shown in the right-turn position.
Figure 10:
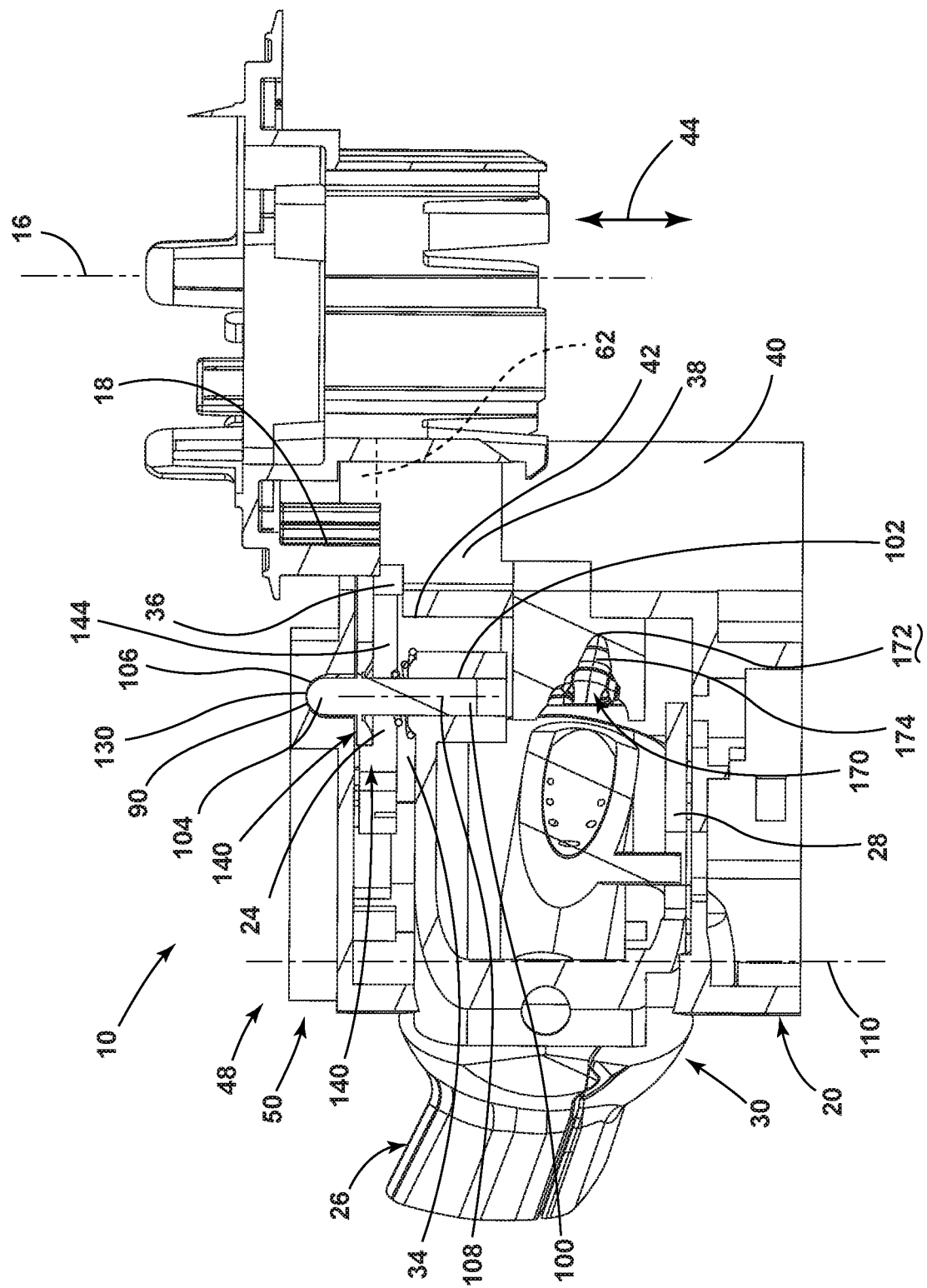
FIG. 10 is the turn signal assembly of FIG. 5 shown in the right-turn position.
Figure 11:
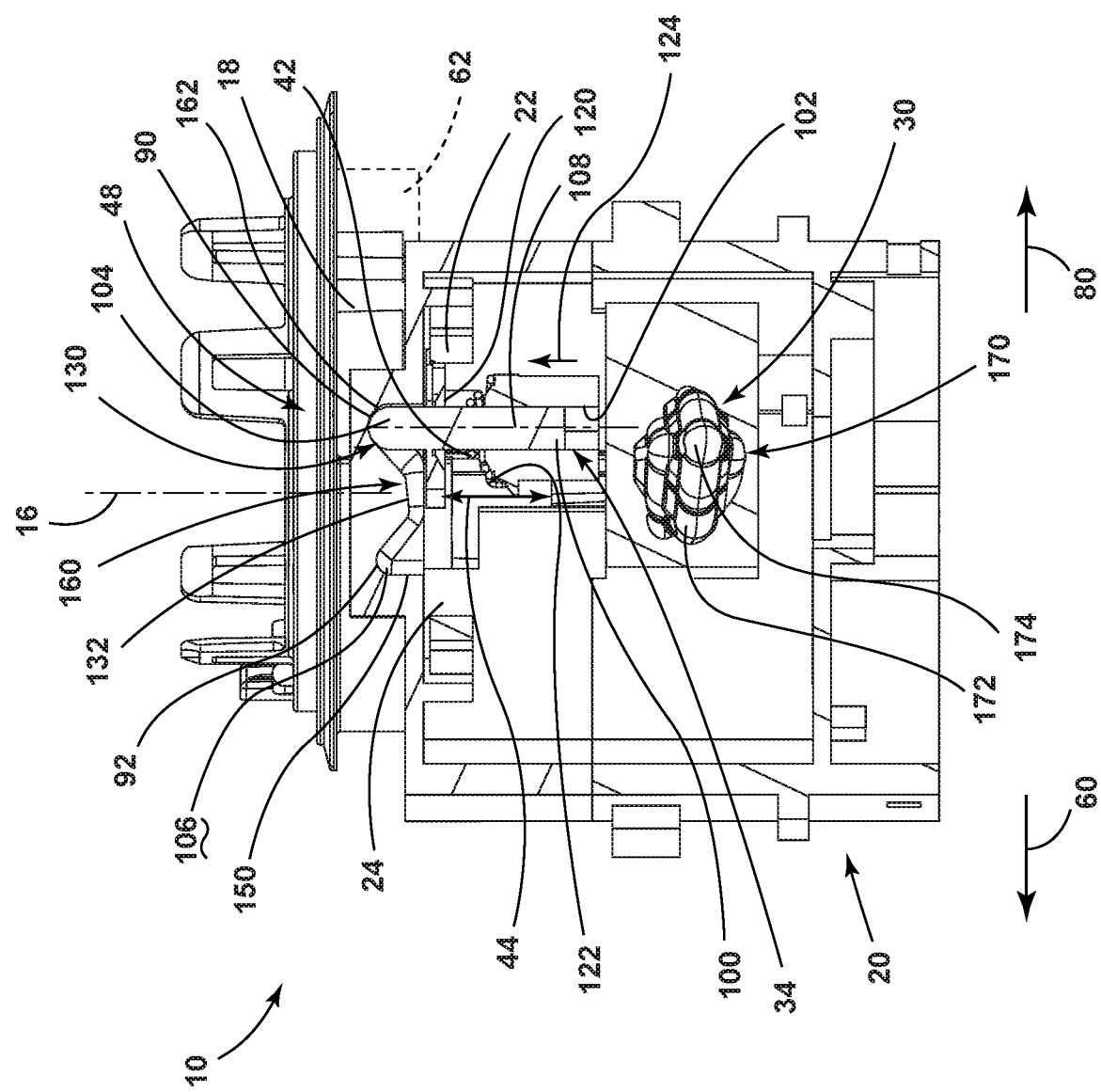
FIG. 11 is the turn signal assembly of FIG. 4 shown in the right-turn position.
Figure 12:
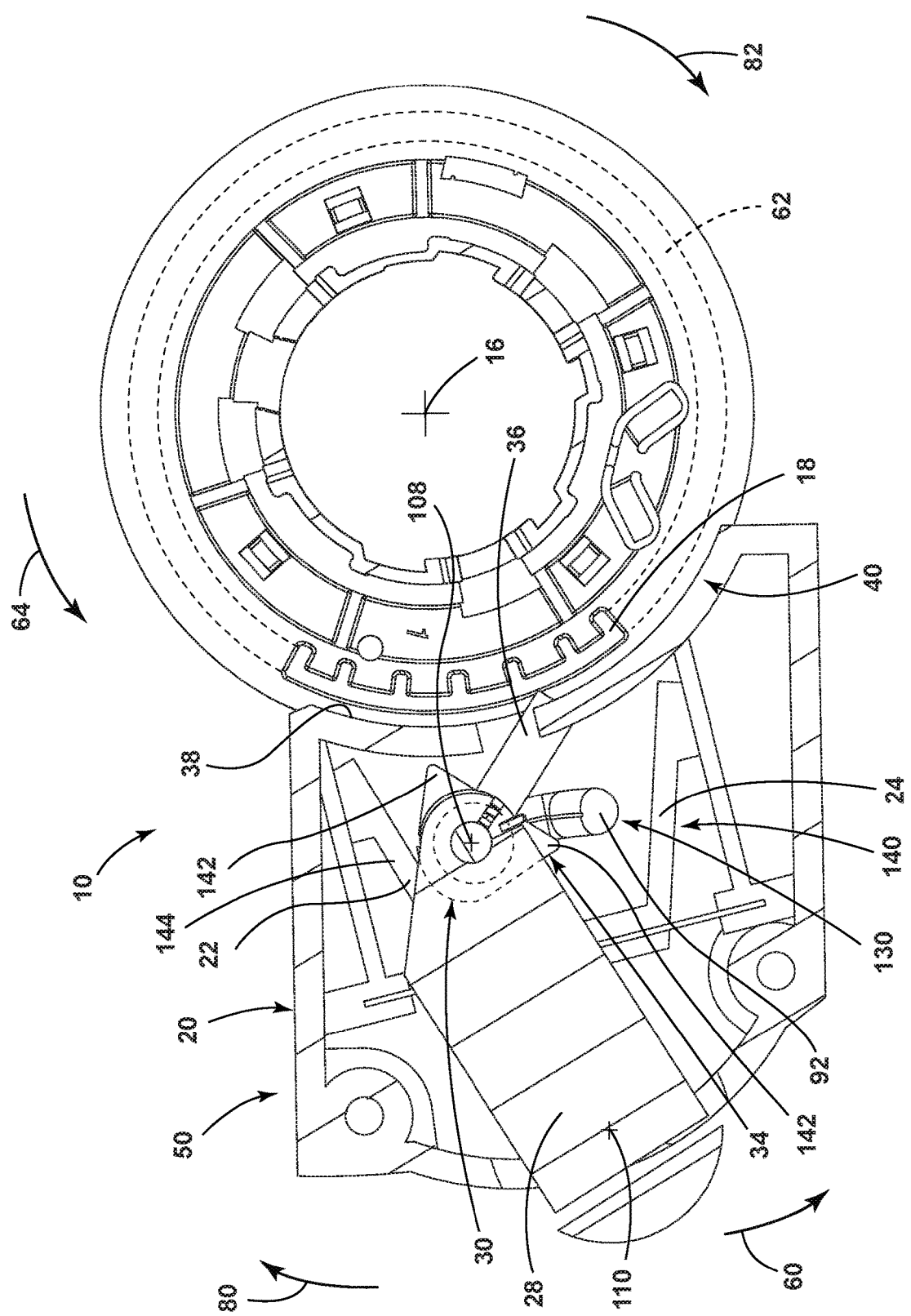
FIG. 12 is the turn signal assembly of FIG. 9 shown in the right-turn position and under a bypass condition.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As exemplified in FIGS. 1-19, reference numeral 10 generally refers to a turn signal assembly that is incorporated within a steering assembly 12 for a vehicle. The steering assembly 12 includes a steering shaft 14 having a rotational axis 16. The steering shaft 14 is attached to and rotates with a clockspring that contains a cancellation rib 18 that also forms a portion of the turn signal assembly 10. A turn-signal housing 20 is included that surrounds the steering shaft 14. The turn signal assembly 10 also includes a cancellation mechanism 48 that includes the cancellation rib 18. The turn-signal housing 20 includes a signal portion 50 that defines a right-turn interface 22 and a left-turn interface 24. A turn signal stalk 26 is rotationally coupled to the signal portion 50 of the turn-signal housing 20 via a trunnion 28 that is rotationally engaged with the turn-signal housing 20. To operate the turn-signal cancellation mechanism 48, the trunnion 28 rotationally operates relative to the turn-signal housing 20 to define the right-turn position 30 and the left-turn position 32. A toggle 34 is selectively and alternatively operated to a rest position 66 that allows the turn signal stalk 26 and the trunnion 28 to return to a null position 68 from one of the right-turn position 30 and the left-turn position 32, depending upon the selection of the user of the vehicle. The toggle 34 includes a cancellation member 36 that extends beyond an internal shaft perimeter 38 of the turn-signal housing 20. The internal perimeter 38 surrounds the steering shaft 14 as well as the cancellation rib 18. Accordingly, the cancellation member 36 continuously extends into a shaft enclosure 40 that is at least partially defined by the turn-signal housing 20.

A spring 42 is included within the turn signal assembly 10 that biases the toggle 34 away from the trunnion 28 and in an axial direction 44 parallel with the rotational axis 16 of the steering shaft 14. Accordingly, the toggle 34 is configured for axial operation relative to the steering shaft 14. Additionally, the toggle 34 rotationally operates relative to the trunnion 28 and the turn-signal housing 20 to facilitate a load transfer from the cancellation rib 18 and through the toggle 34. This load transfer operates the toggle 34 to unseat the turn signal stalk 26 from the latched right-turn and left-turn positions 30, 32, respectively. In certain aspects of the device, the spring 42 can also provide a biasing component in a rotational direction 46 toward the rest position 66. The rotational operation of the toggle 34 also allows a bypassing engagement between the cancellation rib 18 and the cancellation member 36 of the toggle 34. This bypassing engagement allows the cancellation rib 18 to engage and pass by the cancellation member 36 without reset of the turn signal stalk 26 to the null position 68. This bypassing engagement typically occurs in conditions where the steering wheel is turned in the same direction as indicated by the turn signal stalk 26.

Referring again to FIGS. 1-14, operation of the stalk 26 in a first direction 60 engages the toggle 34 with the right-turn interface 22. The right-turn interface 22 cooperates with an axial positioning surface 106 and the spring 42 to bias the toggle 34 away from the trunnion 28 and in the axial direction 44 along the rotational axis 16. This movement selectively locates the toggle 34 and the trunnion 28 in the right-turn position 30 and places the cancellation member 36 within the operational path 62 of the cancellation rib 18. Again, the movement of the cancellation member 36 of the toggle 34 is, in primary part, in the axial direction 44 and parallel with the rotational axis 16 of the steering shaft 14. The cancellation member 36 of the toggle 34 also moves in secondary part in a rotational direction 46 to maintain tangential contact between the toggle interference portions 142 and the right-turn interface 22. This places the cancellation member 36 in selective engagement with the cancellation rib 18 in the right-turn position 30. Accordingly, operation of the toggle 34 and cancellation member 36 in the axial direction 44 moves the cancellation member 36 within and away from the operational path 62 of the cancellation rib 18 of the steering shaft 14.

Once the toggle 34 and the trunnion 28 are in the right-turn position 30, operation of the steering wheel in a second (typically counter-clockwise) rotational direction 82, indicative of movement of the wheels for the vehicle in a right-turn condition which are returning to a straight line condition, causes an engagement between the cancellation rib 18 of the steering shaft 14 with the cancellation member 36 of the toggle 34. This engagement slidably operates the toggle 34 with respect to, and typically against, the right-turn interface 22. This pushes the trunnion 28 and stalk 26 from the stable right-turn position 30, thereby allowing the trunnion 28 and the stalk 26 to return to the null position 68. As the trunnion 28 and stalk 26 return to the null position 68, axial positioning surface 106 assists in biasing the toggle 34 in a direction parallel with the rotational axis 16 and toward the trunnion 28 to the rest position 66. In this rest position 66, the trunnion 28 and stalk 26 are in the null position 68 that is between the right-turn and left-turn positions 30, 32. Additionally, in the rest position 66 of the toggle 34, the cancellation member 36 is offset from the operational path 62 of the cancellation rib 18 in the axial direction 44.

Additionally, when the toggle 34 and the trunnion 28 are in the right-turn position 30, operation of the steering wheel in a first (typically clockwise) rotational direction 64, indicative of movement of the wheels for the vehicle in a right-turn condition, causes the bypassing engagement between the cancellation rib 18 of the steering shaft 14 with the cancellation member 36 of the toggle 34. This engagement causes the toggle 34 to rotate in a counter-clockwise direction, rotating away from contact with the right-turn interface 22. The cancellation member 36 remains slidably in contact with the cancellation rib 18 as biased against it by spring 42, but does not generate any force to cause movement of the toggle 34 into the rest position 66 or rotation of the trunnion 28 or stalk 26 into the null position 68. Once the cancellation rib 18 has rotated past the cancellation member 36 and is no longer in contact with said cancellation member, the toggle 34 rotates back in a clockwise direction to return to contact with the right-turn interface 22.

Referring again to FIGS. 1-8 and 15-19, operation of the stalk 26 in a second (typically counter-clockwise) direction 80 engages the toggle 34 with the left-turn interface 24. This engagement moves the toggle 34 relative to the axial positioning surface 106. The axial positioning surface 106, in turn, allows the spring to bias the toggle 34 away from the trunnion 28 and in the axial direction 44 along the rotational axis 16. This movement selectively locates the toggle 34 and the trunnion 28 in the left-turn position 32 and places the cancellation member 36 within the operational path 62 of a cancellation rib 18. Operation of the steering wheel in a first (typically clockwise) rotational direction 64, indicative of a left-turn condition of the vehicle wheels which are returning to a straight line condition, engages the cancellation rib 18 of the steering shaft 14 with the cancellation member 36 to slidably operate the toggle 34 with respect to, and typically against, the left-turn interface 24. This pushes the trunnion 28 and stalk 26 assembly from the stable left turn position 32, allowing it to return to the null position 68. As this slidable operation occurs, the axial positioning surface 106 serves to assist in biasing the toggle 34 in the axial direction 44 along the rotational axis 16 and toward the trunnion 28, into the rest position 66. In the rest position 66, the trunnion 28 and stalk 26 are in the null position 68 that is between the right-turn and left-turn positions 30, 32. Additionally, in the rest position 66 of the toggle 34, the cancellation member 36 is offset from the operational path 62 of the cancellation rib 18 in the axial direction 44.

Additionally, when the toggle 34 and the trunnion 28 are in the left-turn position 32, operation of the steering wheel in a counter-clockwise rotational direction 82, indicative of movement of the wheels for the vehicle in a left-turn condition, causes an engagement between the cancellation rib 18 of the steering shaft 14 with the cancellation member 36 of the toggle 34. This engagement causes the toggle 34 to rotate in a clockwise direction, rotating away from contact with the left-turn interface 24. The cancellation member 36 remains slidably in contact with the cancellation rib 18 as biased against it by spring 42, but does not generate any force to cause movement of the toggle 34 to the rest position 66 or rotation of the trunnion 28 or stalk 26 to the null position 68. Once the cancellation rib 18 has rotated past the cancellation member 36 and is no longer in contact with said cancellation member, the toggle 34 rotates back in a counter-clockwise direction to return to contact with the left-turn interface 24.

As exemplified in FIGS. 1-19, the toggle 34 includes a guide protrusion 100 that extends through a guide aperture 102 of the trunnion 28, and the guide aperture 102 axially guides the operation of the toggle 34 in the axial direction 44 with respect to the trunnion 28. Additionally, the guide aperture 102 also guides a rotational operation of the toggle 34 about an axis of rotational movement 108. As discussed above, the spring 42 for the turn signal assembly 10 biases the toggle 34 away from the trunnion 28 so that the cancellation member 36 of the toggle 34 is biased toward an interference with the operational path 62 of the cancellation rib 18. The toggle 34 also includes a biasing protrusion 104 that slidably engages an axial positioning surface 106 of the turn-signal housing 20. This engagement of the biasing protrusion 104 with the axial positioning surface 106 cooperates with the spring 42 to define the movement of the toggle 34 in the axial direction 44 with respect to the turn-signal housing 20 and the trunnion 28. Stated another way, the biasing force 124 of the spring 42 continually biases the toggle 34 away from the trunnion 28.

Referring again to FIGS. 4-19, engagement of the biasing protrusion 104 with a sloped surface of the axial positioning surface 106 at least partially overcomes this biasing force 124 of the spring 42 to allow for movement of the toggle 34 toward and away from the trunnion 28 along an axial direction 44 that is parallel with the rotational axis 16 of the steering shaft 14. Through this configuration, the guide protrusion 100 and the biasing protrusion 104 of the toggle 34 also define the axis of rotational movement 108 for the toggle 34 with respect to the guide aperture 102 of the trunnion 28 and the axial positioning surface 106 of the turn-signal housing 20. In certain aspects of the device, the spring 42 can be positioned around the guide protrusion 100 to bias the toggle 34 away from the trunnion 28 and toward the axial positioning surface 106. The axial positioning surface 106 is a sloped and contoured surface that defines a right-turn detent 90, a left-turn detent 92 and a central detent 132. In addition, the axial positioning surface can include an outer boundary wall 150 that serves to contain the biasing protrusion 104 within the area of the axial positioning surface 106.

This axial and rotational movement of the toggle 34 is configured to maintain the cancellation member 36 of the toggle 34 within the path of a cancellation rib 18 when in the right or left-turn positions 30, 32 or axially offset from the cancellation rib 18 when in the rest position 66. The axial rotational movement is typically parallel with the rotational axis 16 of the steering shaft 14. During operation of the stalk 26 and the trunnion 28, the biasing protrusion 104 and the guide protrusion 100 operate axially and rotationally along the axial positioning surface 106. During this combined movement, the axis of rotational movement 108 remains parallel with the axis of rotation for the steering shaft 14. Also, the guide aperture 102 of the trunnion 28 maintains the guide protrusion 100 in a laterally fixed position with respect to the trunnion 28. Accordingly, as the trunnion 28 operates about a trunnion axis 110, the toggle 34, via the guide protrusion 100, axially and rotationally operates along and about the axis of rotational movement 108. The axial component of this operation of the toggle 34 is operated through cooperative operation of the spring 42 and the axial positioning surface 106 of the turn-signal housing 20.

Referring again to FIGS. 1-8, 13 and 18, the spring 42 is typically a compression spring 42 having a first leg 120 that engages the trunnion 28 and a second leg 122 that engages the toggle 34. The compression spring 42 is positioned to exert an axial biasing force 124 that biases the toggle 34 toward the turn-signal housing 20. Additionally, the compression spring 42 can be configured to operate at least partially as a torsion spring 42, where movement of the toggle 34 rotationally operates the first leg 120 of the compression spring 42 relative to the second leg 122 of the compression spring 42 to exert a torsion force 126. Accordingly, the second leg 122 of the compression spring 42 exerts, through a spring-type torque, the torsion force 126 that biases the toggle 34 toward the rest position 66. Simultaneously, the biasing force 124 operates the toggle 34 away from the trunnion 28 and toward the axial positioning surface 106 of the turn-signal housing 20.

Stated another way, operation of the biasing protrusion 104 along the axial positioning surface 106 overcomes the biasing force 124 when the toggle 34 moves to the rest position 66. It is contemplated that the spring 42 continuously exerts the biasing force 124 against the toggle 34 and towards the turn-signal housing 20. When the toggle 34 is moved to the rest position 66, the axial positioning surface 106 further overcomes the biasing force 124 of the spring 42 to move the toggle 34 into the rest position 66 that is nearer to the trunnion 28 for the turn signal assembly 10. Using the compression spring 42 for exerting the biasing force 124, the compression spring 42 can flex to accommodate the rotational movement of the toggle 34 and generate the torsion force 126. The torsion force 126 is typically exerted only when the toggle 34 is moved away from the rest position 66 and the first leg 120 rotates about the axis of rotational movement 108 relative to the second leg 122.

As exemplified in the figures, the axial positioning surface 106 can include respective detents 130 that define and correspond to the right-turn and left-turn positions 30, 32 of the toggle 34 with respect to the turn-signal housing 20. Additionally, a central detent 132 can define the rest position 66 for the toggle 34. It should be understood that the axial positioning surface 106 can include a continuous and smooth surface that defines the rest, right-turn and left-turn positions 66, 30, 32 of the toggle 34. Accordingly, operation of the turn signal assembly 10 between these positions is contemplated to be a smooth and continuous operation that is controlled through operation of the various components, as described herein.

According to various aspects of the device, the right-turn interface 22 and the left-turn interface 24 cooperate with the stalk 26 and the trunnion 28 to operate the toggle 34 between the rest position 66 and the right-turn position 30 and left-turn position 32. According to various aspects of the device, the right-turn interface 22 and the left-turn interface 24 can be part of a slider 140. Alternatively, the right-turn interface 22 and the left-turn interface 24 can be defined by features that extend from or are incorporated within the turn-signal housing 20. The slider 140 engages respective interference portions 142 of the toggle 34 to operate the toggle 34 relative to the turn-signal housing 20 and the trunnion 28 in both the rotational and axial directions 46, 44. The toggle 34 includes an interference portion 142 at each side of the toggle 34 to correspond to the right-turn and left-turn interfaces 22, 24, respectively.

Referring again to FIGS. 1-19, the turn signal assembly 10 includes a detent surface 170 that selectively holds the stalk 26 in the null position 68, which typically corresponds to the rest position 66 of the toggle 34 for the cancellation mechanism 48. The detent surface 170 also includes features that selectively retain the stalk 26 in the latched right and left-turn positions 30, 32. The stalk 26 also includes a spring-loaded stalk protrusion 174 that interacts with the detent surface 170 to generate a latching force. The latching force generated by the stalk protrusion 174 and the detent surface 170 in the latched right and left-turn positions 30, 32 is overcome by the cancellation mechanism 48 to selectively return the stalk 26 from the right-turn and left-turn positions 30, 32 to the null position 68. In the null position 68, a central interface 172 of the detent surface 170 cooperates with the biasing protrusion 104 and the central detent 132 of the axial positioning surface 106 to maintain the toggle 34 in the rest position 66. When the stalk 26 is moved to either of the right-turn or left-turn positions 30, 32, the biasing protrusion 104 of the toggle 34 is moved into the right-turn detent or left-turn detent 90, 92, respectively.

As discussed previously, when the cancellation rib 18 engages the cancellation member 36, the biasing protrusion 104 is moved away from the right-turn detent or left-turn detent 90, 92. Simultaneously, the guide protrusion 100 engages the guide aperture 102 of the trunnion 28 and pulls the trunnion 28 away from the respective right-turn or left-turn positions 30, 32. Once pulled away, the biasing force generated between the stalk protrusion 174 and the central interface 172 of the detent surface 170, returns the trunnion 28 and the stalk 26 to the null position 68.

As discussed herein, when the cancellation member 36 and the cancellation rib 18 engage one another, the guide protrusion 100 of the toggle 34 is biased back into the central detent 132 to define the rest position 66 of the toggle 34. In the rest position 66, the retaining force of the detent surface 170 slides a stalk protrusion 174 of the detent surface 170 away from the right-turn or left-turn positions 30, 32 and back to the central interface 172. In this manner, the stalk 26 and the trunnion 28 are returned to the null position 68 that corresponds to the rest position 66 of the cancellation mechanism 48. The use of the cancellation mechanism 48 described herein provides a compact configuration of the toggle 34 and the trunnion 28. This is accomplished through the movement of the cancellation member 36 of the toggle 34 in the axial direction 44 between the rest position 66 and the right-turn and left-turn positions 30, 32.

Figure 13:
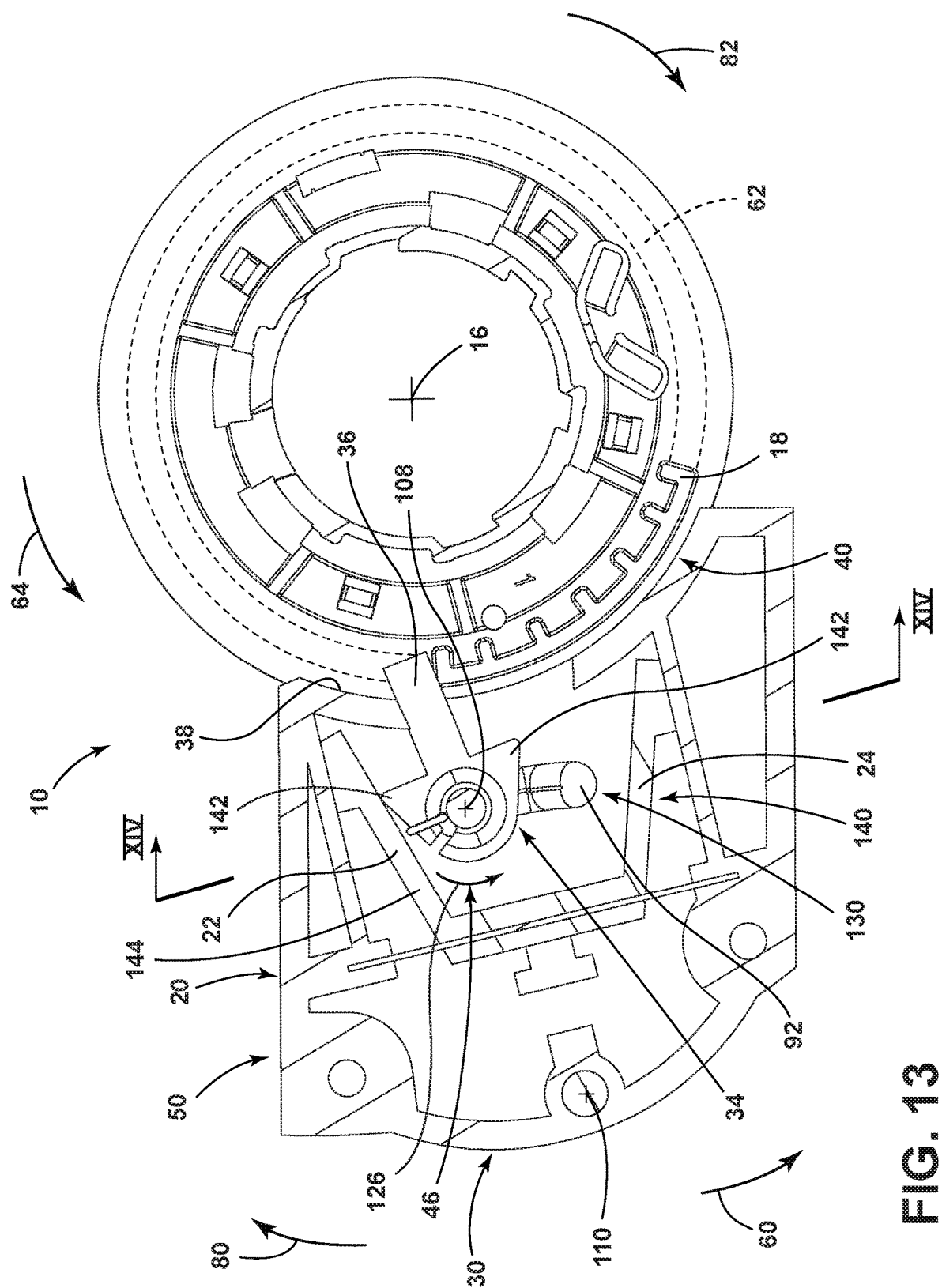
FIG. 13 is the turn signal assembly of FIG. 9 shown in the right-turn position and showing engagement of the cancellation rib and the cancellation member to return the turn-signal assembly to the null position and the toggle to the rest position.
Figure 14:
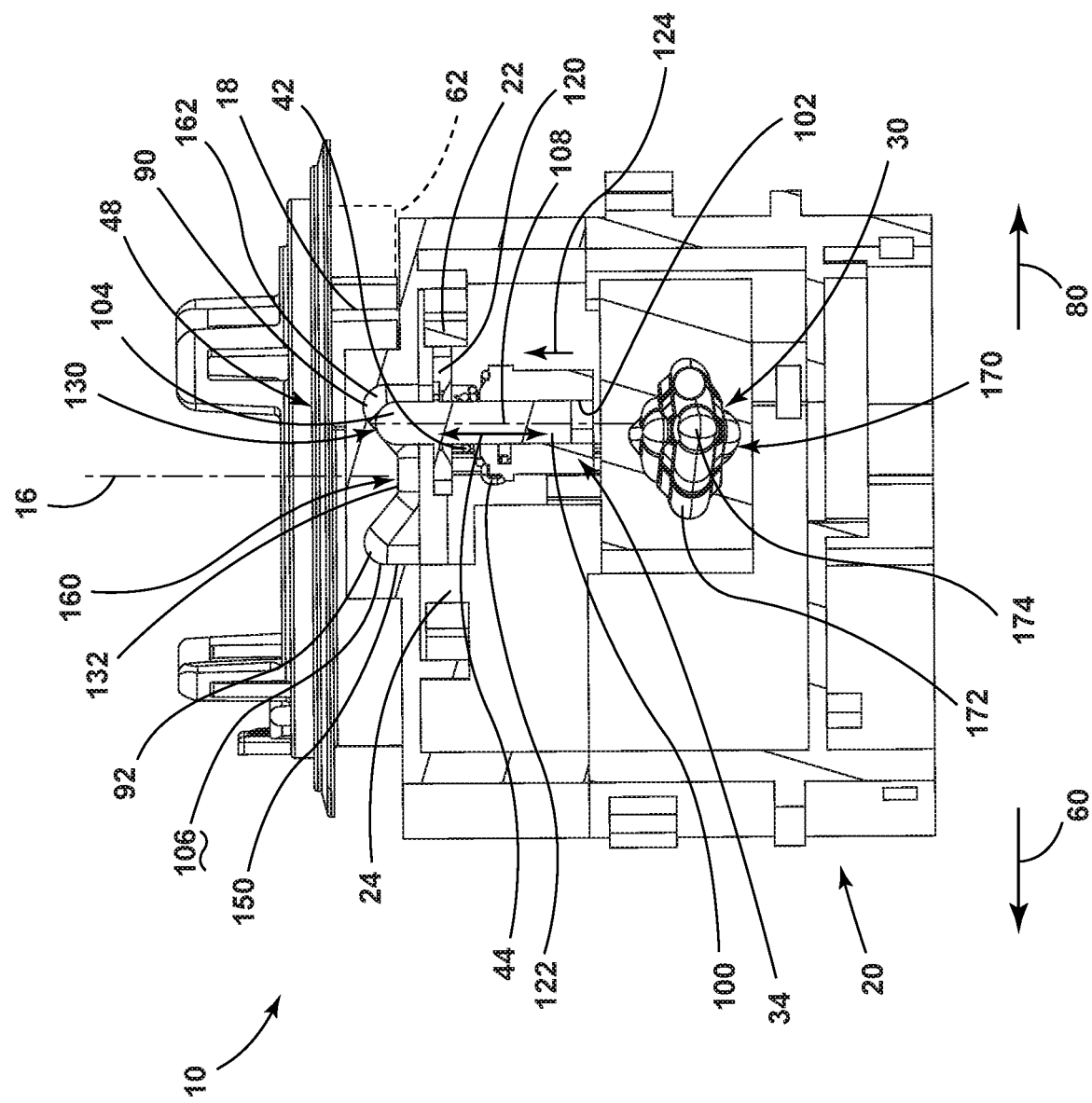
FIG. 14 is a cross-sectional view of the turn-signal assembly of FIG. 13 taken along line XIV-XIV and showing the toggle returning to the central detent and the rest position.
Figure 15:
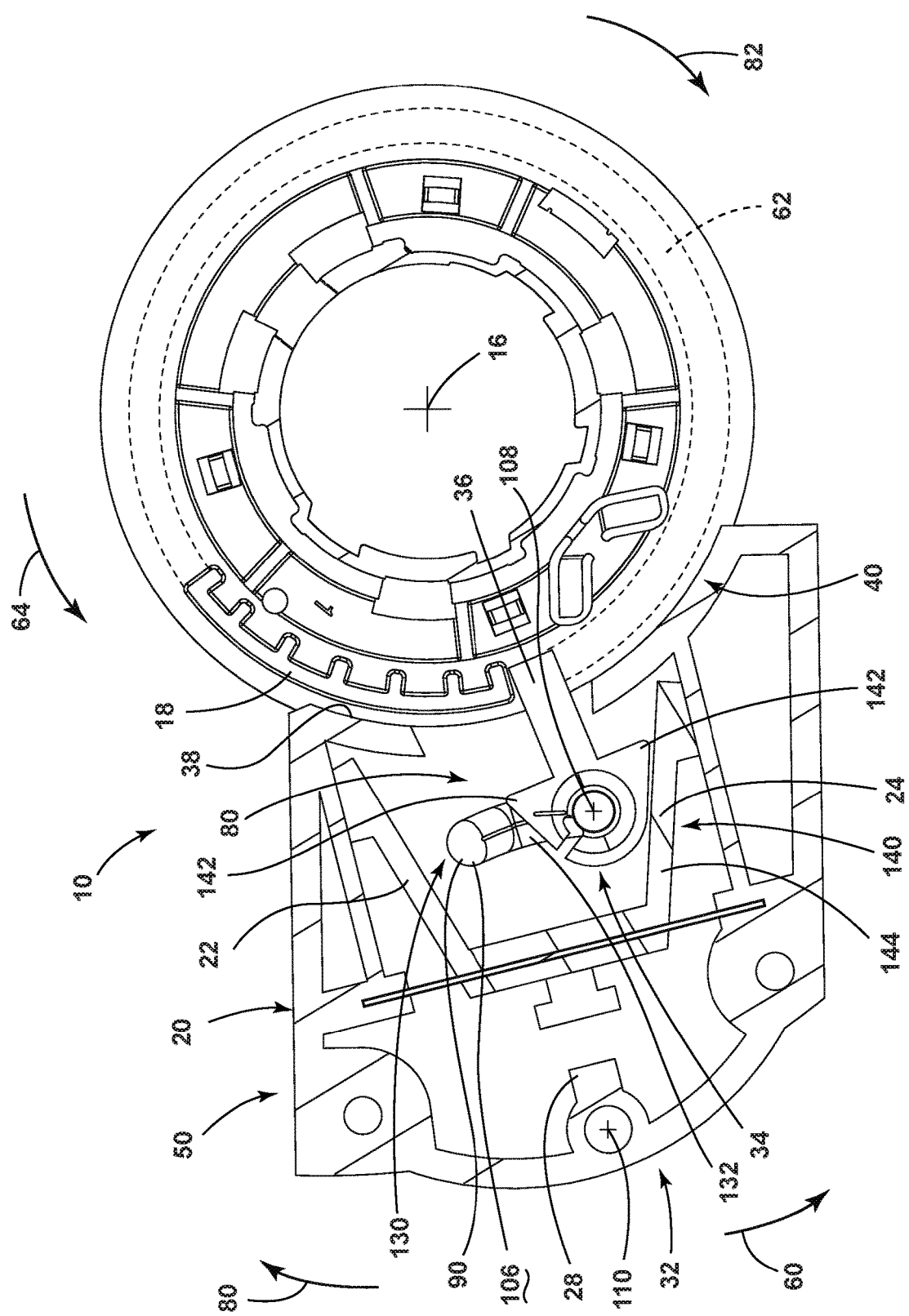
FIG. 15 is the turn signal assembly of FIG. 6 shown in the left-turn position.
Figure 16:
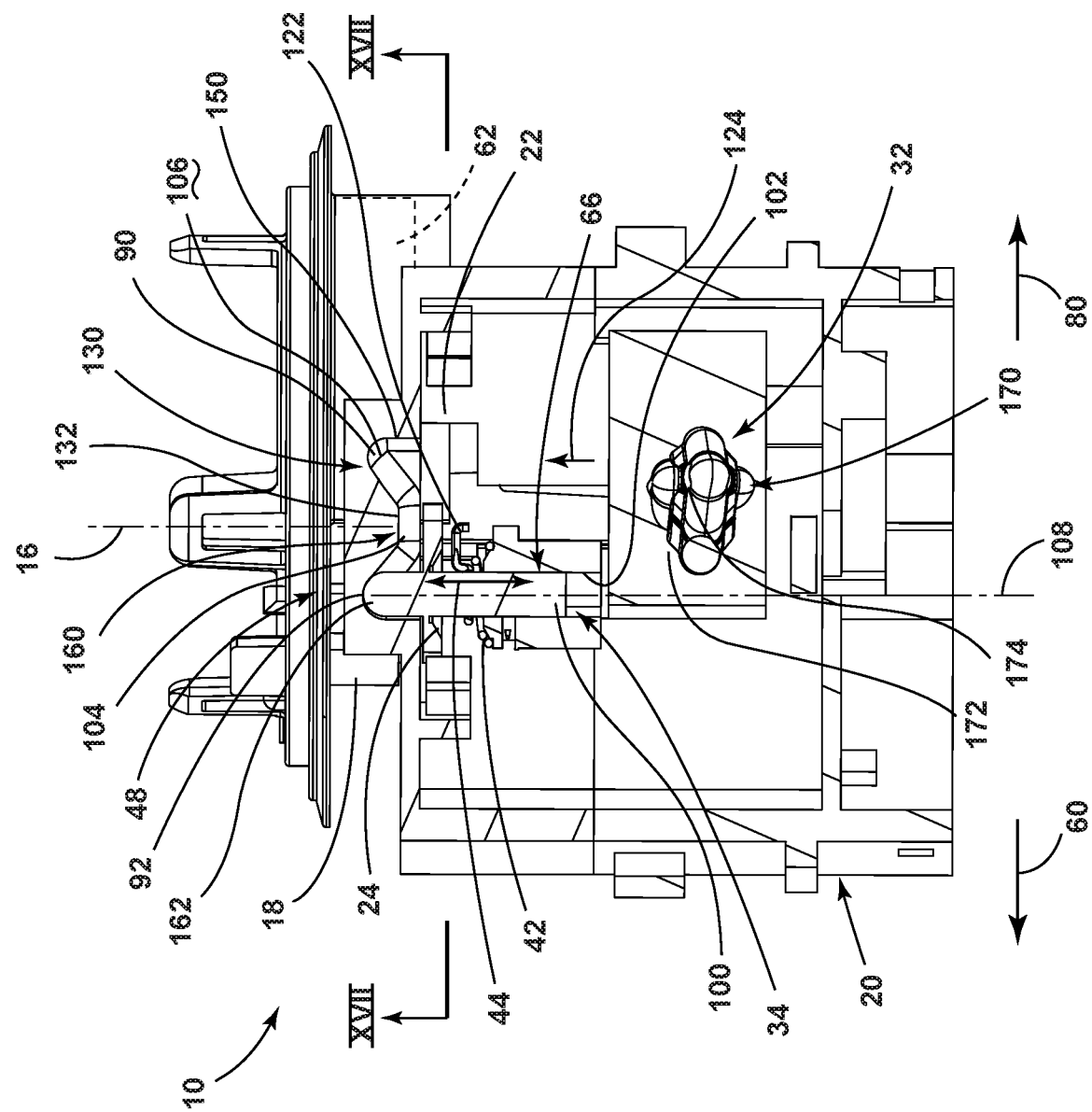
FIG. 16 is the turn signal assembly of FIG. 4 shown in the left-turn position.
Figure 17:
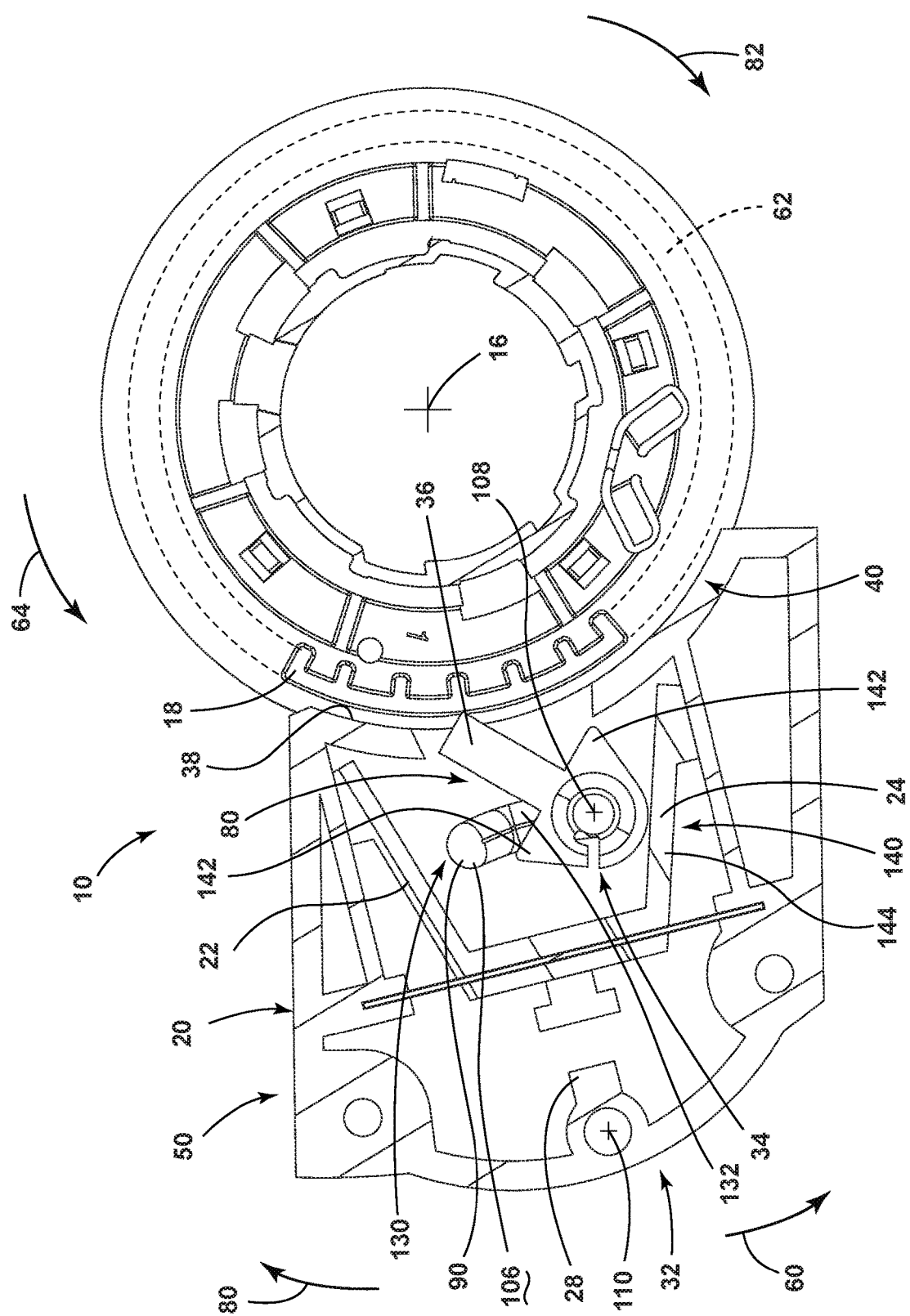
FIG. 17 is the turn signal assembly of FIG. 15 shown in the left-turn position and under a bypass condition.
Figure 18:
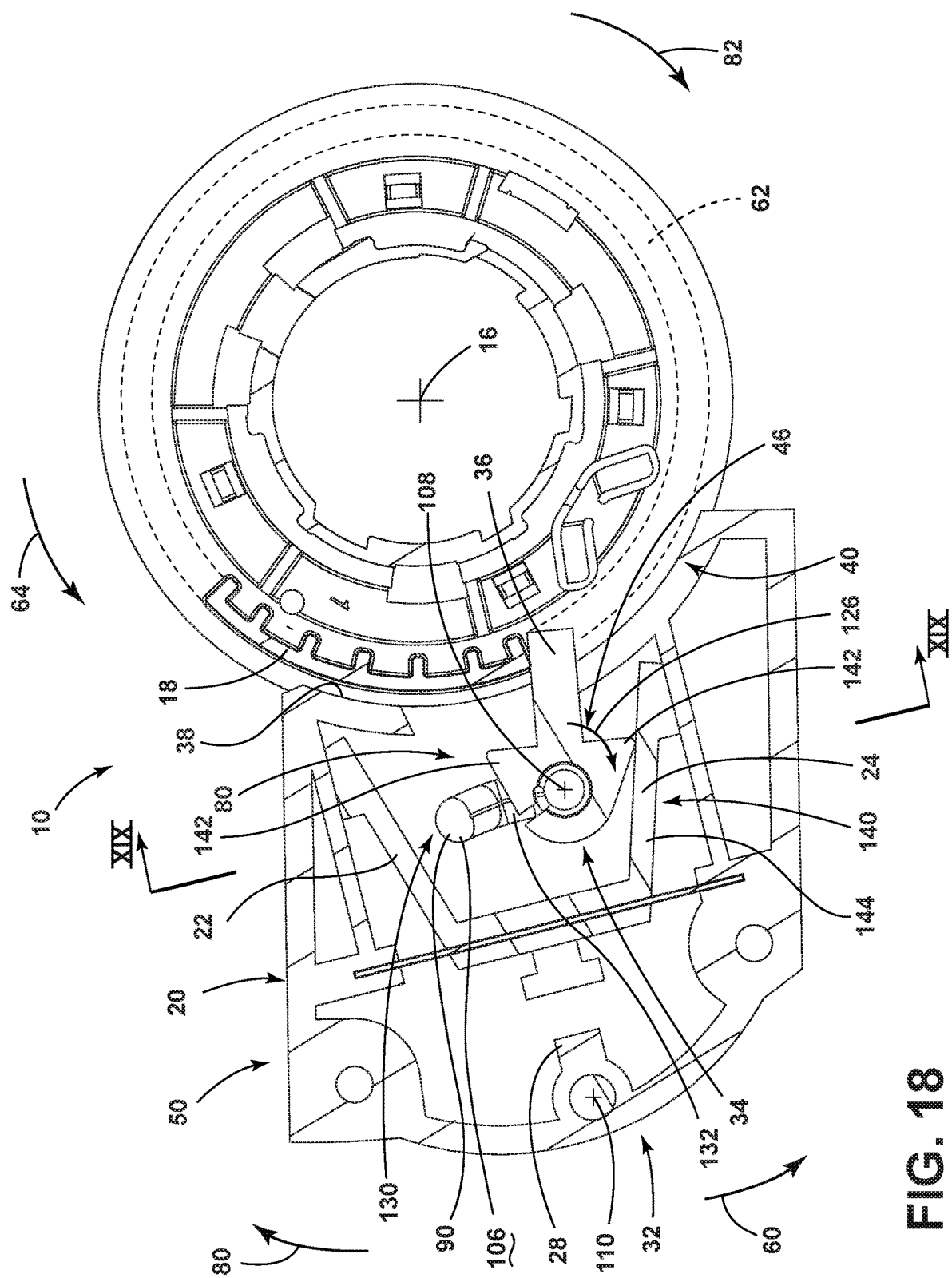
FIG. 18 is the turn signal assembly of FIG. 15 shown in the left-turn position and showing engagement of the cancellation rib and the cancellation member to return the turn-signal assembly to the null position and the toggle to the rest position.
Figure 19:
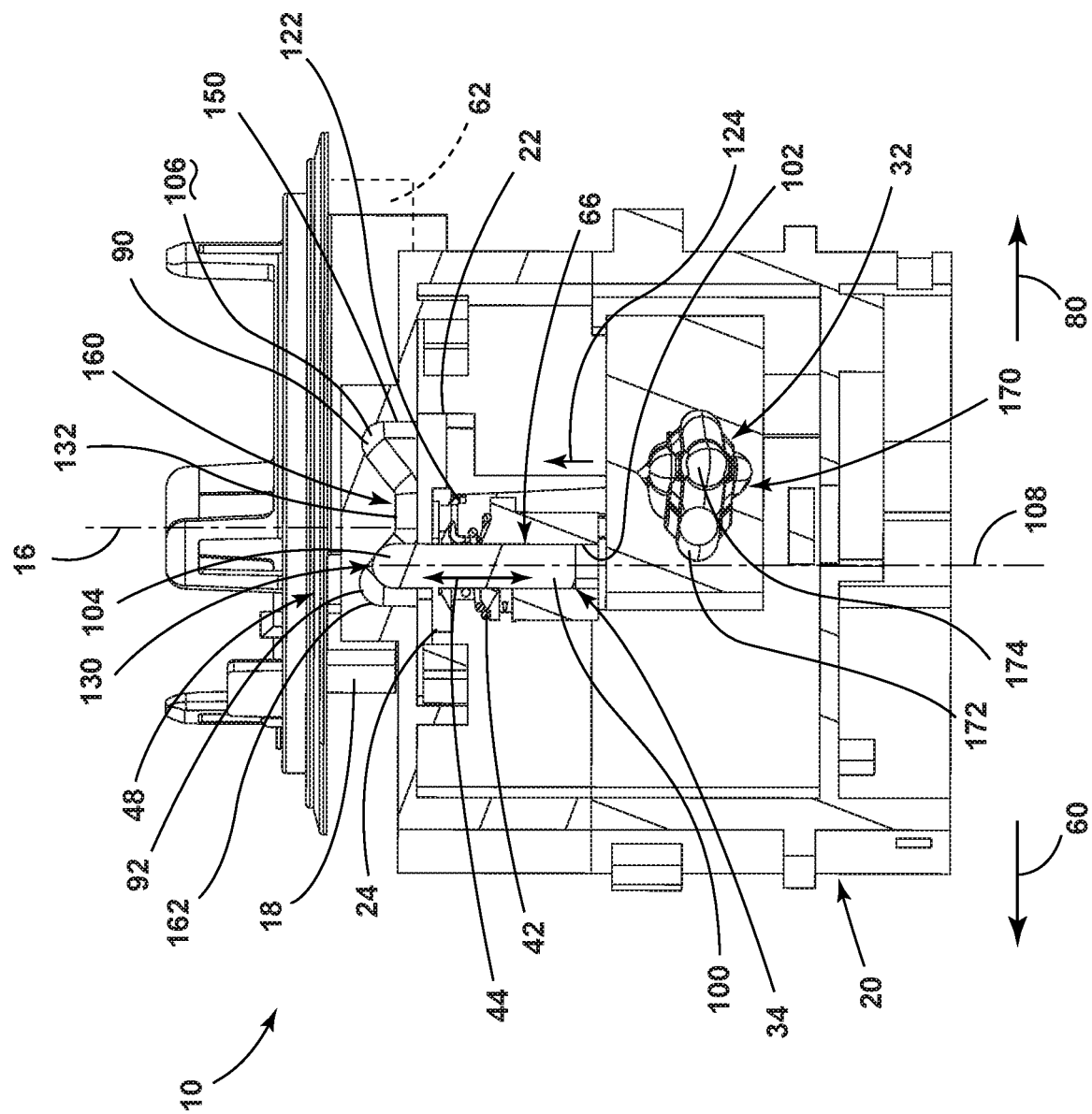
FIG. 19 is a cross-sectional view of the turn-signal assembly of FIG. 18 taken along line XIX-XIX and showing the toggle returning to the central detent and the rest position.

Referring now to FIGS. 13 and 18, it is contemplated that with the slider 140 containing the right-turn and left-turn interfaces 22, 24, the turn signal assembly 10 can withstand a hold-down component or abuse load that can be effected when the stalk 26 of the turn signal assembly 10 is held in the right-turn position 30 or the left-turn position 32, as the steering wheel is operated in the opposite direction of the indicated turn and the cancellation rib 18 engages the cancellation member 36. In a typical operation of the cancellation mechanism 48, spring arms 144 of the slider 140 provide a preload that resists displacement of the slider 140. The preload of the slider 140 provides a preferential force sufficient to instead move the toggle 34 toward the central detent 132. This results in operation of the stalk 26 and trunnion 28 from the latched right or left-turn positions 30, 32 back to the null position 68. In an abuse load of the cancellation mechanism 48 where the stalk 26 is held in the right-turn or left-turn positions 30, 32, engagement of the cancellation rib 18 with the cancellation member 36 can be absorbed through displacement of the slider 140 from the normal position against the slider 140 spring load to prevent damage to the turn signal assembly 10. The hold-down component or abuse load overcomes the preload of the spring arms 144. In this manner, the spring arms 144 deflect to absorb the forces resulting from the hold-down component or abuse load. The outer boundary wall 150 of the axial positioning surface 106 also assists in maintaining the biasing protrusion 104 within the axial positioning surface 106 during this hold down condition as well as other non-conforming or abuse loads that may be experienced by the toggle 34 and other components of the turn signal assembly 10.

As exemplified in FIGS. 1-19, the operation of the toggle 34 for the turn signal assembly 10 is designed to disengage the toggle 34 in the rest position 66, and preventing interaction between the cancellation member 36 and the cancellation rib 18 by moving the toggle 34 axially, either away from or toward the driver in a direction parallel with the rotational axis 16 of the steering shaft 14. The design of the turn signal assembly 10 includes the auto cancel mechanism that has the toggle 34 that interacts with the cancellation rib 18 on the steering shaft 14. Again, the toggle 34 can be disengaged, or placed in the rest position 66, and can also be placed in right-turn or left-turn positions 30, 32 by moving axially relative to the trunnion 28 and the turn-signal housing 20. The turn signal assembly 10 utilizes a combination torsion and compression spring 42 to bias the toggle 34 away from the trunnion 28, toward the turn-signal housing 20 and also toward the rest position 66. As discussed above, the turn-signal housing 20 contains the axial positioning surface 106 that the biasing protrusion 104 of the toggle 34 slidably follows. This profile is shaped such that it has a peak 160 having the central detent 132 that forces the cancellation member 36 of the toggle 34 away and along the rotational axis 16 of the steering shaft 14, and axially offset from the cancellation rib 18 when the turn signal stalk 26 is in the null position 68. When the turn signal stalk 26 departs from the null position 68 to indicate a right-turn or left-turn position 30, 32, the axial positioning surface 106 includes corresponding valleys 162 that allow the cancellation member 36 of the toggle 34 to axially approach the operational path 62 of the cancellation rib 18 when in the right-turn or left-turn positions 30, 32.

According to various aspects of the device, the toggle 34 can operate axially to be biased either toward or away from the driver, depending upon the positioning of the turn signal assembly 10 with respect to the steering shaft 14. Accordingly, where the terms right-turn or left-turn are indicated in the figures and the specification, the opposite orientation may also be used, depending on the design of the vehicle.

According to various aspects of the device, the toggle 34 is configured for axial operation relative to the steering shaft 14 that places the cancellation member 36 within the operational path 62 and axially offset from the operational path 62 of the cancellation rib 18 for the steering shaft 14. Accordingly, the toggle 34 containing the cancellation member 36 extends into the shaft enclosure 40 for the steering shaft 14 at all times. However, because the cancellation member 36 is offset from the path of the cancellation rib 18, no engagement occurs between the cancellation rib 18 and the cancellation member 36 for the toggle 34 when the turn signal stalk 26 is in the central null position 68. When the stalk 26 is moved into the right-turn or left-turn positions 30, 32, movement of the trunnion 28 with respect to the turn-signal housing 20 causes a movement of the toggle 34 in an axial direction 44 that places the cancellation member 36 within the operational path 62 of the cancellation rib 18. This axial operation of the toggle 34 can provide for a more compact assembly for the turn signal assembly 10. This construction is also advantageous as it is less sensitive to radial misalignment of the rotational axis 16 of the steering shaft 14 and the central axis of the stalk 26 and trunnion 28 of turn signal assembly 10, which is generally perpendicular or oblique to the rotational axis 16.

According to various aspects of the device, significant interfaces of the turn-signal assembly 10 reside between the toggle 34 and the right-turn and left-turn interfaces 22, 24, between the toggle 34 and the axial positioning surface 106, and between the toggle 34 and the cancellation rib 18, although other significant operational relationships are present. The operational relationships between these components define the cancellation mechanism 48 that releases the trunnion 28 and the stalk 26 from the right-turn and left-turn positions 30, 32. It should be understood that the positioning of the toggle 34, the right-turn and left-turn interfaces 22, 24 and the axial positioning surface 106 can be modified to be located on the trunnion 28 and the turn-signal housing 20 in various combinations and permutations without deviating from the intended operational configurations of the toggle 34, the right-turn and left-turn interfaces 22, 24 and the axial positioning surface 106. Accordingly, where these components are discussed as being located on one of the trunnion 28 or the turn-signal housing 20, the component may alternatively be located on the other of the trunnion 28 or the turn signal housing 20.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A steering assembly for a vehicle, the steering assembly comprising:
 a turn-signal housing having a signal portion and defining a shaft enclosure;
 a steering shaft having a cancellation rib that rotates about a rotational axis and within the shaft enclosure;
 a trunnion that rotates within the signal portion of the turn-signal housing about a trunnion axis to define a null position and right-turn and left-turn positions; and
 a toggle having a cancellation member, wherein the toggle axially and rotationally operates with respect to one of the trunnion and the turn-signal housing to define an axis of rotational movement, wherein the cancellation member in the null position is within the shaft enclosure and axially offset from the cancellation rib with respect to the rotational axis of the steering shaft, and wherein the cancellation member in one of the right-turn and left-turn positions is within the shaft enclosure and axially aligned for selective engagement with the cancellation rib, wherein selective engagement of the cancellation rib and the cancellation member axially operates the toggle to the null position.

2. The steering assembly of claim 1, wherein during operation of the toggle between the null position and the right-turn and left-turn positions, the axis of rotational movement remains parallel with at least one of the trunnion axis and the rotational axis of the steering shaft.

3. The steering assembly of claim 1, wherein a stalk extends from the trunnion and rotationally operates about the trunnion axis between the null position and the right-turn and left-turn positions.

4. The steering assembly of claim 1, wherein the toggle slidably engages an axial positioning surface of the turn-signal housing, wherein the axial positioning surface axially guides the toggle between a rest position, corresponding to the null position, and the right-turn and left-turn positions.

5. The steering assembly of claim 4, further comprising:
a right-turn interface and a left-turn interface that selectively engage interference portions of the toggle, wherein the right-turn interface and the left-turn interface cooperate with the axial positioning surface and the trunnion to rotationally operate the toggle between the rest position and the right-turn and left-turn positions.

6. The steering assembly of claim 5, wherein the right-turn and left-turn interfaces extend from the turn-signal housing.

7. The steering assembly of claim 5, wherein the toggle includes a biasing protrusion that is aligned with the axis of rotational movement and slidably operates through the axial positioning surface.

8. The steering assembly of claim 4, wherein a spring biases the toggle away from the trunnion and toward the axial positioning surface.

9. The steering assembly of claim 8, wherein the spring is positioned around a guide protrusion of the toggle, wherein the guide protrusion extends through a guide aperture.

10. The steering assembly of claim 8, wherein the axial positioning surface is a sloped surface that defines right-turn and left-turn detents that correspond to the right-turn and left-turn positions.

11. The steering assembly of claim 10, wherein the axial positioning surface includes a central detent that corresponds to the rest position, wherein the central detent is axially offset from the right-turn and left-turn detents.

12. A steering assembly for a vehicle, the steering assembly comprising:
a steering shaft that rotates about a rotational axis, wherein the steering shaft includes a cancellation rib;
a turn-signal housing having an internal shaft perimeter that surrounds the steering shaft and the cancellation rib;
a trunnion that is rotationally coupled to the turn-signal housing and rotates about a trunnion axis; and
a toggle that rotationally and axially operates relative to the trunnion and the turn-signal housing, wherein the toggle includes a cancellation member that extends through the internal shaft perimeter to selectively engage the cancellation rib in a right-turn position and a left-turn position, and wherein the cancellation member extends through the internal shaft perimeter and is axially offset from the cancellation rib, with respect to the rotational axis of the steering shaft, in a rest position where the cancellation rib bypasses the cancellation member.

13. The steering assembly of claim 12, wherein a stalk extends from the trunnion and rotationally operates about the trunnion axis between a null position, corresponding to the rest position of the toggle, and the right-turn and left-turn positions.

14. The steering assembly of claim 13, wherein when the trunnion is in the null position, rotational operation of the trunnion toward the right-turn position biases the toggle from a central detent to a right-turn detent to define the right-turn position, and wherein an axial positioning surface guides the cancellation member into a path of the cancellation rib.

15. The steering assembly of claim 13, wherein when the trunnion is in the null position, rotational operation of the trunnion toward the left-turn position biases the toggle from a central detent to a left-turn detent to define the left-turn position, and wherein an axial positioning surface guides the cancellation member into a path of the cancellation rib.

16. A turn signal cancellation mechanism comprising:
a housing having an internal shaft perimeter that surrounds a rotational axis, wherein the internal shaft perimeter is configured to surround a steering shaft and a cancellation member that rotationally operate about the rotational axis;
a trunnion that is rotationally coupled to the housing and rotates about a trunnion axis; and
a toggle having a biasing protrusion that slidably engages an axial positioning surface of the housing and a guide protrusion that extends through a guide aperture of the trunnion, wherein the biasing protrusion and the guide protrusion rotationally and axially operate about an axis of rotation that remains parallel with the trunnion axis, and wherein the toggle includes the cancellation member that extends through the internal shaft perimeter and toward the rotational axis, wherein the cancellation member is configured to selectively engage a cancellation rib in a turn position and further configured to be axially offset with respect to the rotational axis, from the cancellation rib in a rest position where the cancellation rib bypasses the cancellation member.

17. The turn signal cancellation mechanism of claim 16, wherein a spring biases the toggle away from the trunnion and toward the axial positioning surface.

18. The turn signal cancellation mechanism of claim 17, wherein the spring is positioned around the guide protrusion of the toggle, wherein the guide protrusion extends through the guide aperture.

19. The turn signal cancellation mechanism of claim 16, wherein the axial positioning surface is a sloped surface that defines right-turn and left-turn detents that correspond to right-turn and left-turn positions.

20. The turn signal cancellation mechanism of claim 19, wherein the axial positioning surface includes a central detent that corresponds to the rest position, wherein the central detent is axially offset from the right-turn and left-turn detents.

* * * * *